(12) United States Patent
Galia et al.

(10) Patent No.: US 10,394,871 B2
(45) Date of Patent: Aug. 27, 2019

(54) SYSTEM TO PREDICT FUTURE PERFORMANCE CHARACTERISTIC FOR AN ELECTRONIC RECORD

(71) Applicant: Hartford Fire Insurance Company, Hartford, CT (US)

(72) Inventors: Kathleen H. Galia, South Seaville, NJ (US); David Gamble, West Hartford, CT (US); Bixia Li, South Windsor, CT (US); Kelly J. McLaughlin, Cobalt, CT (US); Tracey Ellen Steger, Glastonbury, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 326 days.

(21) Appl. No.: 15/296,257

(22) Filed: Oct. 18, 2016

(65) Prior Publication Data
US 2018/0107734 A1 Apr. 19, 2018

(51) Int. Cl.
*G06F 16/35* (2019.01)
*G06Q 40/08* (2012.01)
*G06F 16/36* (2019.01)

(52) U.S. Cl.
CPC .............. *G06F 16/35* (2019.01); *G06F 16/36* (2019.01); *G06Q 40/08* (2013.01)

(58) Field of Classification Search
CPC ......... G06F 17/30705; G06F 17/30731; G06F 16/35

(Continued)

(56) References Cited

U.S. PATENT DOCUMENTS 5,613,072 A 3/1997 Hammond et al.
5,664,109 A 9/1997 Johnson et al.
(Continued)

FOREIGN PATENT DOCUMENTS

WO 01/13295 A1 2/2001

OTHER PUBLICATIONS

Young, Virginia R. "Robust Bayesian Credibility Using Semiparametric Models", Astin Bulletin, vol. 28, No. 1, 1998, (pp. 187-203, 17 total pages).

(Continued)

*Primary Examiner* — Joshua Bullock
(74) *Attorney, Agent, or Firm* — Buckley, Maschoff & Talwalkar LLC

(57) ABSTRACT

Text input data for an electronic record may be aggregated and mapped to create composite text input data. A semantic event in the composite text input data may be automatically detected, and a text mining result database may be updated by adding an entry identifying the detected semantic event and a triggering semantic rule. An indication for the electronic record may then be transmitted to a back-end application computer server that also determines at least one parameter corresponding to a characteristic of the electronic record. The computer server may then execute a computerized predictive model to predict a future performance characteristic indicator for the electronic record based on the at least one parameter and the indication received from the text mining platform, wherein the future performance characteristic indicator is indicative of a likelihood of an actual value of the electronic record differing from a predicted value of the electronic record.

16 Claims, 22 Drawing Sheets

(58) Field of Classification Search
USPC .......................................................... 707/776
See application file for complete search history.

(56) References Cited

U.S. PATENT DOCUMENTS

| | | |
|---|---|---|
| 5,712,984 A | 1/1998 | Hammond et al. |
| 5,796,932 A | 8/1998 | Fox et al. |
| 5,819,226 A | 10/1998 | Gopinathan et al. |
| 5,926,800 A | 7/1999 | Baronowski et al. |
| 5,950,150 A | 9/1999 | Lloyd et al. |
| 5,970,464 A | 10/1999 | Apte et al. |
| 6,014,632 A | 1/2000 | Gamble et al. |
| 6,067,488 A | 5/2000 | Tano |
| 6,078,857 A | 6/2000 | Jung et al. |
| 6,112,225 A | 8/2000 | Kraft et al. |
| 6,154,658 A | 11/2000 | Caci |
| 6,163,770 A | 12/2000 | Gamble et al. |
| 6,204,757 B1 | 3/2001 | Evans et al. |
| 6,246,934 B1 | 6/2001 | Otake et al. |
| 6,438,547 B1 | 8/2002 | Mehr et al. |
| 6,594,579 B1 | 7/2003 | Lowrey et al. |
| 6,611,740 B2 | 8/2003 | Lowrey et al. |
| 6,643,578 B2 | 11/2003 | Levine |
| 6,710,738 B2 | 3/2004 | Allen, Jr. |
| 6,756,915 B2 | 6/2004 | Choi |
| 6,768,417 B2 | 7/2004 | Kuragaki et al. |
| 6,832,141 B2 | 12/2004 | Skeen et al. |
| 6,839,305 B2 | 1/2005 | Perlman et al. |
| 6,853,956 B2 | 2/2005 | Ballard, Jr. et al. |
| 6,917,952 B1 | 7/2005 | Dailey et al. |
| 6,920,379 B2 | 7/2005 | Miyamoto |
| 6,925,425 B2 | 8/2005 | Remboski et al. |
| 6,957,133 B1 | 10/2005 | Hunt et al. |
| 6,959,296 B1 | 10/2005 | Reiss |
| 6,965,326 B2 | 11/2005 | Allison |
| 6,973,319 B2 | 12/2005 | Ormson |
| 6,977,612 B1 | 12/2005 | Bennett |
| 6,985,922 B1 | 1/2006 | Bashen et al. |
| 7,007,245 B2 | 2/2006 | D'Souza et al. |
| 7,039,592 B1 | 5/2006 | Yegge et al. |
| 7,039,654 B1 | 5/2006 | Eder |
| 7,072,841 B1 | 7/2006 | Pednault |
| 7,215,255 B2 | 5/2007 | Grush |
| 7,392,201 B1 | 6/2008 | Binns et al. |
| 7,542,913 B1 | 6/2009 | Meek et al. |
| 7,702,615 B1 | 4/2010 | Delurgio et al. |
| 7,840,397 B2 | 11/2010 | Chiou |
| 8,117,043 B2 | 2/2012 | Hu et al. |
| 8,359,209 B2 | 1/2013 | McLaughlin et al. |
| 8,457,984 B2 | 6/2013 | Hu et al. |
| 8,571,900 B2 | 10/2013 | Belhe et al. |
| 8,620,698 B2 | 12/2013 | Hu et al. |
| 8,798,987 B2 | 8/2014 | McLaughlin et al. |
| 8,903,756 B2 | 12/2014 | Zhao et al. |
| 9,026,551 B2 | 5/2015 | Drennan, III |
| 2001/0020229 A1 | 9/2001 | Lash |
| 2002/0010598 A1 | 1/2002 | Johnson et al. |
| 2002/0072958 A1 | 6/2002 | Yuyama et al. |
| 2002/0099596 A1 | 7/2002 | Geraghty |
| 2002/0147617 A1 | 10/2002 | Schoenbaum et al. |
| 2002/0161609 A1 | 10/2002 | Zizzamia et al. |
| 2002/0173885 A1 | 11/2002 | Lowrey et al. |
| 2002/0194113 A1 | 12/2002 | Lof et al. |
| 2002/0198801 A1 | 12/2002 | Dixon et al. |
| 2003/0028406 A1 | 2/2003 | Herz et al. |
| 2003/0061075 A1 | 3/2003 | Heckman et al. |
| 2003/0097330 A1 | 5/2003 | Hillmer et al. |
| 2003/0101080 A1 | 5/2003 | Zizzamia et al. |
| 2003/0105651 A1 | 6/2003 | Gendelman |
| 2003/0167191 A1 | 9/2003 | Slabonik et al. |
| 2003/0171956 A1 | 9/2003 | Cox et al. |
| 2004/0103002 A1 | 5/2004 | Colley et al. |
| 2004/0128147 A1 | 7/2004 | Vallinayagam et al. |
| 2004/0133439 A1 | 7/2004 | Noetzold et al. |
| 2004/0138927 A1 | 7/2004 | Eydeland et al. |
| 2004/0153362 A1 | 8/2004 | Bauer et al. |
| 2004/0186753 A1 | 9/2004 | Kim et al. |
| 2004/0199410 A1 | 10/2004 | Feyen et al. |
| 2004/0220784 A1 | 11/2004 | Stephenson et al. |
| 2004/0220837 A1 | 11/2004 | Bonissone et al. |
| 2004/0220838 A1 | 11/2004 | Bonissone et al. |
| 2004/0220839 A1 | 11/2004 | Bonissone et al. |
| 2004/0220840 A1 | 11/2004 | Bonissone et al. |
| 2004/0230459 A1 | 11/2004 | Dordick et al. |
| 2004/0236611 A1 | 11/2004 | Bonissone et al. |
| 2004/0236676 A1 | 11/2004 | Takezawa et al. |
| 2004/0249557 A1 | 12/2004 | Harrington et al. |
| 2004/0249679 A1 | 12/2004 | Henderson et al. |
| 2005/0055248 A1 | 3/2005 | Helitzer et al. |
| 2005/0055249 A1 | 3/2005 | Helitzer et al. |
| 2005/0060141 A1 | 3/2005 | Suzuki et al. |
| 2005/0060207 A1 | 3/2005 | Weidner et al. |
| 2005/0070299 A1 | 3/2005 | Caspi et al. |
| 2005/0091080 A1 | 4/2005 | Biats, Jr. |
| 2005/0091085 A1 | 4/2005 | Colley et al. |
| 2005/0108063 A1 | 5/2005 | Madill, Jr. et al. |
| 2005/0108066 A1 | 5/2005 | Weidner et al. |
| 2005/0125213 A1 | 6/2005 | Chen et al. |
| 2005/0125259 A1 | 6/2005 | Annappindi |
| 2005/0131742 A1 | 6/2005 | Hoffman et al. |
| 2005/0137912 A1 | 6/2005 | Rao et al. |
| 2005/0171885 A1 | 8/2005 | Christman et al. |
| 2005/0192850 A1 | 9/2005 | Lorenz |
| 2005/0203828 A1 | 9/2005 | Lyakovetsky |
| 2005/0222867 A1 | 10/2005 | Underwood et al. |
| 2005/0228692 A1 | 10/2005 | Hodgdon |
| 2005/0234742 A1 | 10/2005 | Hodgdon |
| 2005/0240451 A1 | 10/2005 | Johnson et al. |
| 2005/0262039 A1 | 11/2005 | Kreulen et al. |
| 2005/0276401 A1 | 12/2005 | Madill, Jr. et al. |
| 2006/0009289 A1 | 1/2006 | McCarten et al. |
| 2006/0015253 A1 | 1/2006 | Ochs et al. |
| 2006/0015360 A1 | 1/2006 | Ochs et al. |
| 2006/0015373 A1 | 1/2006 | Cuypers |
| 2006/0015374 A1 | 1/2006 | Ochs et al. |
| 2006/0053038 A1 | 3/2006 | Warren et al. |
| 2006/0064332 A1 | 3/2006 | Schoenbaum et al. |
| 2006/0136273 A1 | 6/2006 | Zizzamia et al. |
| 2006/0187889 A1 | 8/2006 | Mehta et al. |
| 2006/0242046 A1 | 10/2006 | Haggerty et al. |
| 2006/0259333 A1 | 11/2006 | Pyburn et al. |
| 2006/0287892 A1 | 12/2006 | Jones et al. |
| 2007/0016500 A1 | 1/2007 | Chatterji et al. |
| 2007/0016508 A1 | 1/2007 | Lapointe et al. |
| 2007/0016542 A1 | 1/2007 | Rosauer et al. |
| 2007/0021987 A1 | 1/2007 | Binns et al. |
| 2007/0027725 A1 | 2/2007 | Dirnberger et al. |
| 2007/0027726 A1 | 2/2007 | Warren et al. |
| 2007/0043656 A1 | 2/2007 | Lancaster |
| 2007/0043662 A1 | 2/2007 | Lancaster |
| 2007/0106539 A1 | 5/2007 | Gay |
| 2007/0118399 A1 | 5/2007 | Avinash et al. |
| 2008/0040676 A1 | 2/2008 | Garg et al. |
| 2008/0126138 A1 | 5/2008 | Cherney et al. |
| 2008/0236177 A1 | 10/2008 | Senba et al. |
| 2014/0379386 A1* | 12/2014 | Drennan, III ......... G06Q 40/08 705/4 |
| 2015/0205863 A1 | 7/2015 | Drennan, III |
| 2016/0034662 A1 | 2/2016 | Moynihan et al. |
| 2016/0034664 A1 | 2/2016 | Santos et al. |
| 2016/0055589 A1 | 2/2016 | Billings |
| 2017/0124079 A1* | 5/2017 | Drennan, III ....... G06F 17/3053 |

OTHER PUBLICATIONS

Yan, Weizhong et al., "Designing a Neural Network Decision System for Automated Insurance Underwriting", 2006 International Joint Conference on Neural Networks, Sheraton Vancouver Wall Centre Hotel, Vancouver, BC, Jul. 2016, (pp. 2016-2113, 8 total pages).

Wu, Cheng-Sheng Peter et al., "Does Credit Score Really Explain Insurance Losses? Multivariate Analysis from a Data Mining Point

(56) References Cited

OTHER PUBLICATIONS of View", 2003 CAS Winter Forum, Casualty Actuarial Society, 2003, (pp. 113-138, 26 total pages).
Wu, Cheng-Sheng Peter et al., "A View Inside the "Black Box:" A Review and Analysis of Personal Lines Insurance Credit Scoring Models Filed in the State of Virginia", Casualty Actuarial Society Forum, Winter 2004, (pp. 251-290, 33 total pages).
Woodley, Ruth Ann et al., "Assessing Predictive Modeling Tools for Pricing and Underwriting", Health Watch, Jan. 2016, Issue 51, (pp. 30-33, 4 total pages).
Woodfield, Terry J. "Paper 071-30: Predicting Workers' Compensation Insurance Fraud Using SAS® Enterprise Miner™ 5.1 and SAS 5.1 and SAS Text Miner", SUGI 30, Data Mining and Predictive Modeling, 2004, (pp. 1-6, 6 total pages).
Woodfield, Terry J. "Paper 13-26: Predictive Modeling in the Insurance Industry Using SAS Software", Advanced Tutorials, 2001, 5pgs.
Bardis, Emmanuel T. et al., "Considerations Regarding Standards of Materiality in Estimates of Outstanding Liabilities", Casualty Actuarial Society Forum, Fall 2006, (pp. 1-65, 65 total pages).
Murphy, Karl et al., "A Method for Projecting Individual Large Claims", Casualty Actuarial Society Forum, Fall 2006, (pp. 205-236, 32 total pages).
Sullivan, Dan et al., "Text Mining Improves Business Intelligence and Predictive Modeling in Insurance", Information Management Magazine, Jul. 2003, retrieved Jan. 27, 2011, retrieved from http://www.information-manatement.com/../6995 . . . , (pp. 1-5, 5 total pages).
Werner, Geoff et al., "GLM Basic Modeling: Avoiding Common Pitfalls", Casualty Actuarial Society Forum, Winter 2007, (pp. 257-272, 16 total pages).
Antonio, Katrien et al., "Lognormal Mixed Models for Reported Claims Reserves", North American Actuarial Journal 10:1, (Jan. 2006), (pp. 30-48, 19 total pages).
Apte, C.V., et al., "A probabilistic estimation framework for predictive modeling analytics", IBM Systems Journal, No. 41, No. 3, (2002), (pp. 438-448, 11 total pages).
Apte, C.V. et al., "Data-intensive analytics for predictive modeling", IBM Journal of Research and Development, vol. 47, No. 1, January 20143 (pp. 17-23, 7 total pages).
Axelrod, Randy C. et al., "Predictive Modeling in Health Plans", Disease Management & Health Outcomes, vol. 11, No. 12, (2003), 1173-8790/03/0012-0779, (pp. 779-787, 9 total pages).
Bolstad, William M. "Introduction to Bayesian Statistics", A. John Wiley & Sons. 2nd Edition, 2007, 450 pages.
Hudson, Dave et al., "Survey of Data Management and Data Quality Texts: CAS Data Management and Information Educational Materials Working Party", Casualty Actuarial Society Forum, 2007, (pp. 273-306, 34 total pages).
Conger, Robert F. et al., Predictive Modeling in Workers Compensation, Property/Casualty Insurance, Emphasis 2006, (pp. 18-21, 4 total pages), 2006.
D'Arcy, Stephen P. "Predictive Modeling in Automobile Insurance: A Preliminary Analysis", Paper presented at World Risk and Insurance Economics Congress, Aug. 2005, 33 pages.
de Alba, Enrique, "Bayesian Estimation of Outstanding Claims Reserves", North American Actuarial Journal, vol. 6, No. 4, 2002, (pp. 1-20, 20 total pages).
de Ville, Barry, "Decision Trees for Business Intelligence and Data Mining Using SAS Enterprise Miner", SAS Press Series, 2006, 243 pages.
Deloitte & Touche, "Advanced analytics and the art of underwriting: Transforming the insurance industry", At least as early as Sep. 3, 2003. 12 pages.
Deloitte & Touche, "Presentation Predictive Modeling for Claims: The New Claim Frontier", (2006), 31 pages.
Derrig, Richard et al., "Comparison of Methods and Software for Modeling Nonlinear Dependencies: A Fraud Application", (2006), 25 pages.
Derrig, Richard, et al., "Distinguishing the Forest from the TREES: A Comparison of Tree Based Data Mining Methods", Casualty Actuarial Society Forum, Winter 2006, (pp. 1-49, 49 total pages).
Ellingsword, Marty et al., "Text Mining Improves Business Intelligence and Predictive Modeling in Insurance", DM Review, (Jul. 2003), 6 pages, retrieved from http://www.dmreview.com/editorial/dmreview/print_action.cfm?articleId=6996, retrieved Sep. 6, 2006.
Ellis, Randall et al., "Applying Diagnosis-Based Predictive Models to Group Underwriting", Society of Actuaries, Issue 46, (Aug. 2003), (pp. 4-7, 5 total pages).
Fellingham, Gilbert W., et al., "Comparing Credibility Estimates of Health Insurance Claims Costs", North American Actuarial Journal, vol. 9 No. 1, (2005), (pp. 1-12, 12 total pages).
Fetterolf, Don "Paradise Lost: Return on Investment in Disease Management", Health Watch, Issue 52, (May 2006), (pp. 14-17, 4 total pages).
Presentation—"Predictive Modeling Workshop: Training for development and deployment", Francis Analytics and Actuarial Data Mining, At least as early as Sep. 3, 2003,13 pages.
Grimes, Seth "The Word on Text Mining", Presentation, Portals, Collaboration, and Content Management. (Apr. 14, 2005), 32 pages.
Guszcza, James et al., "Predictive Modeling for Property-Casualty Insurance", Presentation to SoCal Actuarial Club. (Sep. 22, 2004), 40 pages.
Guven, Serhat "Predictive Modeling", Future Fellows, (Jun. 2006), 3 pages. Retrieved from http://www.casact.org/newsletter/index.cfm?fa=viewart&id=5216, retrieved Jan. 2, 2008.
Hong, Se June et al., "Advances in Predictive Model Generation for Data Mining", IBM Research Report RC-21570, (1999), 18 pages.
MacLeod, N. J. et al., Paper, "Entropy-Reducing Properties of Predictive Financial Models", Aug. 27, 1992, Actuarial Research Clearing House, vol. 3 (1993), (pp. 205-229, 25 total pages).
Magnify Press Release, Magnify Applies Predictive Modeling to Worker's Comp Underwriting and Fraud Detection. Chicago, IL (Mar. 1, 2005). 2 pages.
Magnify Press Release, "Predictive Modeling Demonstrates Effectiveness for Auto, Property and Worker's Comp", Erie Insurance Reduces Fraud Losses with FraudFocus, (Feb. 4, 2005), 2 pages.
Meyers, Glenn "On Predictive Modeling for Claim Severity", Casualty Actuarial Society Forum, (Spring 2005), (pp. 215-253, 39 total pages).
Monsour, Christopher, Presentation: "Discrete Predictive Modeling", Casualty Actuarial Society, Special Interest Seminar on Predictive Modeling, (Oct. 5, 2004), 82 pages.
Monsour, Christopher, Presentation: "What is Predictive Modeling?", (Spring 2005), Towers Perrin, 80 pages.
Morgan, I. M. et al., "Conjugate Bayesian Analysis of the Negative Binomial Distribution" Actuarial Research Clearing House. vol. 1, (1993), (pp. 97-113, 17 total pages).
Mosley, Roosevelt "The Use of Predictive Modeling in the Insurance Industry", Pinnacle Actuarial Resources Inc., (Jan. 2005), 4 pages.
Muller, Stacey "Predictive Modeling: Using Claims Data to Find Trends and Cost Drivers", Milliman Consultant's Corner, At least as early as Sep. 4, 2003, 3 pages.
Pednault, Edwin P. D. et al., "Handling Imbalanced Data Sets in Insurance Risk Modeling", IBM Research Report RC-21731, (Mar. 10, 2000), 6 pages.
Pednault, Edwin P. D. et al., "The Importance of Estimation Errors in Cost-Sensitive Learning", IBM Research Report RC-21757, (May 30, 2000), 7 pages.
Weyuker, Lori et al., "Session 3PD:Predictive Modeling Applications", Record, vol. 31, No. 2, New Orleans Health/Pension Spring Meeting, (Jun. 2005), 17 pages.
"Predictive Modeling Raises Opportunities and Issues for Actuaries and Insurers", CAS Annual Meeting is Told, Insurance Newscast, (Dec. 15, 2005), 2 pages.
Cumming, Robert Bruce "Session 99OF:Predictive Modeling", Record, vol. 28, No. 2, Spring Meeting, San Francisco, CA, (Jun. 2002), 20 pages.
Hoo, Emma "Session 64PD:Predictive Modeling—Current Practices and Future Applications", Record, vol. 30, No. 1, Spring Meeting, Anaheim, CA, (May 2004), 20 pages.

(56) References Cited

OTHER PUBLICATIONS

Roberts, Jack "Fighting CAT risk creep", Risk & Insurance, vol. 18, No. 8, ISSN: 1050-9232, Jul. 1, 2007, (p. 26 (2), 3pgs.

"Insurance Risk Management, Insurance Scoring, Insurance Risk Modeling Software", Rosella Data Mining & Database Analytics, Downloaded from www.roselladb.com/insurance-risk-analysis.htm. At least as early as Sep. 3, 2003, 6 pages.

"Predictive Modeling and Predictive Models:Predicting Modeling Software", Rosella Data Mining & Predictive Analytics, Downloaded from www.roselladb.com/predictive-modeling.htm. At least as early as Sep. 3, 2003, 5 pages.

Rosenberg, Marjorie A. et al., "Predictive Modeling with Longitudinal Data: A Case Study of Wisconsin Nursing Homes", School of Business, University of Wisconsin, (Feb. 4, 2006). (pp. 1-23, 23 total pages).

Roudebush, Brad et al., "Converting Clinical Literature to an Insured Population: A Comparison of Models Using NHANES", North American Actuarial Journal, vol. 6, No. 4, (2002), (pp. 55-66, 12 total pages).

Sanche, Robert et al., "Variable Reduction for Predictive Modeling with Clustering", Casualty Actuarial Society Forum, (Winter 2006), (pp. 89-100, 12 total pages).

Sharp, Keith P. "Aspects of Interest Rate Models", Actuarial Research Clearing House, vol. 1, (Aug. 25, 1990), (pp. 433-457, 26 total pages).

Steed, Judy "Winning Ways", Toronto Star, (May 21, 2007), (p. 1-4, 4 total pages).

Stehno, Chris E. "What We Have Learned in the Last 50 Years—and Aren't Using", Health Watch, Issue 52, (May 2006), (pp. 18-21, 4 total pages).

Wolak, Dan et al., "An Actuarial Response to the Health-Care Crisis", Health Section News, Issue No. 47, Apr. 2004, 8 pages.

Tkach, Daniel S. "Information Mining with the IBM Intelligent Miner Family", (An IBM Software Solutions White Paper), (Feb. 1998), 30 pages.

Wang, Wei "Predictive Modeling Based on Classification and Pattern Matching Methods", Thesis, (May 1999), 134 pages.

\* cited by examiner

| SEMANTIC RULE IDENTIFIER 862 | RULE DESCRIPTION 864 | SEMANTIC TAGS 866 |
|---|---|---|
| SR_100001 | 3RD_PARTY_ONLY | 3RD; THIRD; PARTY; PARTIES; EMPLOYER |
| SR_100002 | ANIMAL_BITE | DOG; DOGS; ATTACK; ATTACKS; CLAIMANT |
| SR_100003 | OFF_PREMISES | LEAVE; PREMISE; FACTORY; OUTSIDE |
| SR_100004 | SCHOOL | CAMPUS; STUDENT; TEACHER; CLASSROOM |

*FIG. 8B*

| TEXT MINING RESULT IDENTIFIER 882 | LOSS EVENT 884 | DATE 886 | RULE IDENTIFIER 888 | CLAIM IDENTIFIER 890 |
|---|---|---|---|---|
| TMR_10001 | ANIMAL BITE | 7/15/2010 | SR_100001 | C_4389523 |
| TMR_10002 | BACK INJURY | 4/21/2014 | SR_100010 | C_8782378 |
| TMR_10003 | ACCIDENT | 11/30/2015 | SR_100093 | C_1348933 |
| TMR_10004 | BACK INJURY | 1/14/2016 | SR_100010 | C_2372978 |
| TMR_10005 | PREGNANCY | 7/15/2016 | SR_100077 | C_0983778 |

SYSTEM TO PREDICT FUTURE PERFORMANCE CHARACTERISTIC FOR AN ELECTRONIC RECORD

BACKGROUND

An entity, such as enterprise, may want to analyze or "mine" large amounts of data, such as text data. For example, an enterprise might want to analyze tens of thousands of text files to look for patterns (e.g., so that predictions can be made and/or resources may be allocated in appropriate ways). Note that an entity might analyze this data in connection with different purposes, and, moreover, different purposes may need to analyze the data in different ways. For example, a single acronym might refer to one thing when it appears in one type of document and different thing when it appears in a different type of document. It can be difficult to identify patterns across such large amounts of data and different purposes. In addition, manually managing the different needs and requirements (e.g., different logic rules) associated with different purposes can be a time consuming and error prone process.

Note that electronic records may be used to store information for an enterprise. Moreover, it may be advantageous for an enterprise to correctly predict future values that might be associated with each electronic record (e.g., so that decisions can be made as appropriate). The future value of some types of information may be predictable with a high degree of certainty. For other types of information, however, the confidence an enterprise can have in predicting the future value (or values) may be much lower. The propensity for a value to differ from its predicted value is referred to herein as "volatility." In some cases, text based characteristics and/or patterns associated with an electronic might be indicative of volatility.

Identification and proper handling of electronic records with high volatility potential may allow for improved alignment of resources. Thus, there is a need in the art for methods and systems using text mining to identify highly volatile data values. In addition, there is a need in the art for methods and systems of addressing these values.

SUMMARY OF THE INVENTION

According to some embodiments, systems, methods, apparatus, computer program code and means are provided for using text mining to identify highly volatile data values. In some embodiments, text input data for an electronic record may be aggregated and mapped to create composite text input data. A semantic event in the composite text input data may be automatically detected, and a text mining result database may be updated by adding an entry identifying the detected semantic event and a triggering semantic rule. An indication for the electronic record may then be transmitted to a back-end application computer server that also determines at least one parameter corresponding to a characteristic of the electronic record. The computer server may then execute a computerized predictive model to predict a future performance characteristic indicator for the electronic record based on the at least one parameter and the indication received from the text mining platform, wherein the future performance characteristic indicator is indicative of a likelihood of an actual value of the electronic record differing from a predicted value of the electronic record.

Some embodiments provide: means for aggregating and mapping received text input data to create composite text input data for the electronic record; means for automatically detecting a semantic event in the composite text input data triggered by a semantic rule and associated semantic tag; means for flagging the detected semantic event as meeting a pre-determined condition; means for updating a text mining result database, responsive to the flag, by adding an entry to the database identifying the detected semantic event and the triggering semantic rule; means for transmitting an indication for the electronic record based on the associated data in the text mining result database; means for determining at least one parameter corresponding to a characteristic of the electronic record; means for executing a computerized predictive model to predict a future performance characteristic indicator for the electronic record based on the at least one parameter and the indictor received from the text mining platform, wherein the future performance characteristic indicator is indicative of a likelihood of an actual value of the electronic record differing from a predicted value of the electronic record; and means for outputting an indication of the predicted future performance characteristic indictor for the electronic record.

A technical effect of some embodiments of the invention is an improved and computerized way of using text mining to identify highly volatile data values. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 8B illustrates a tabular portion of a semantic rules database in accordance with some embodiments.

FIG. 8C illustrates a tabular portion of a text mining results database in accordance with some embodiments.

DETAILED DESCRIPTION

Figure 1:
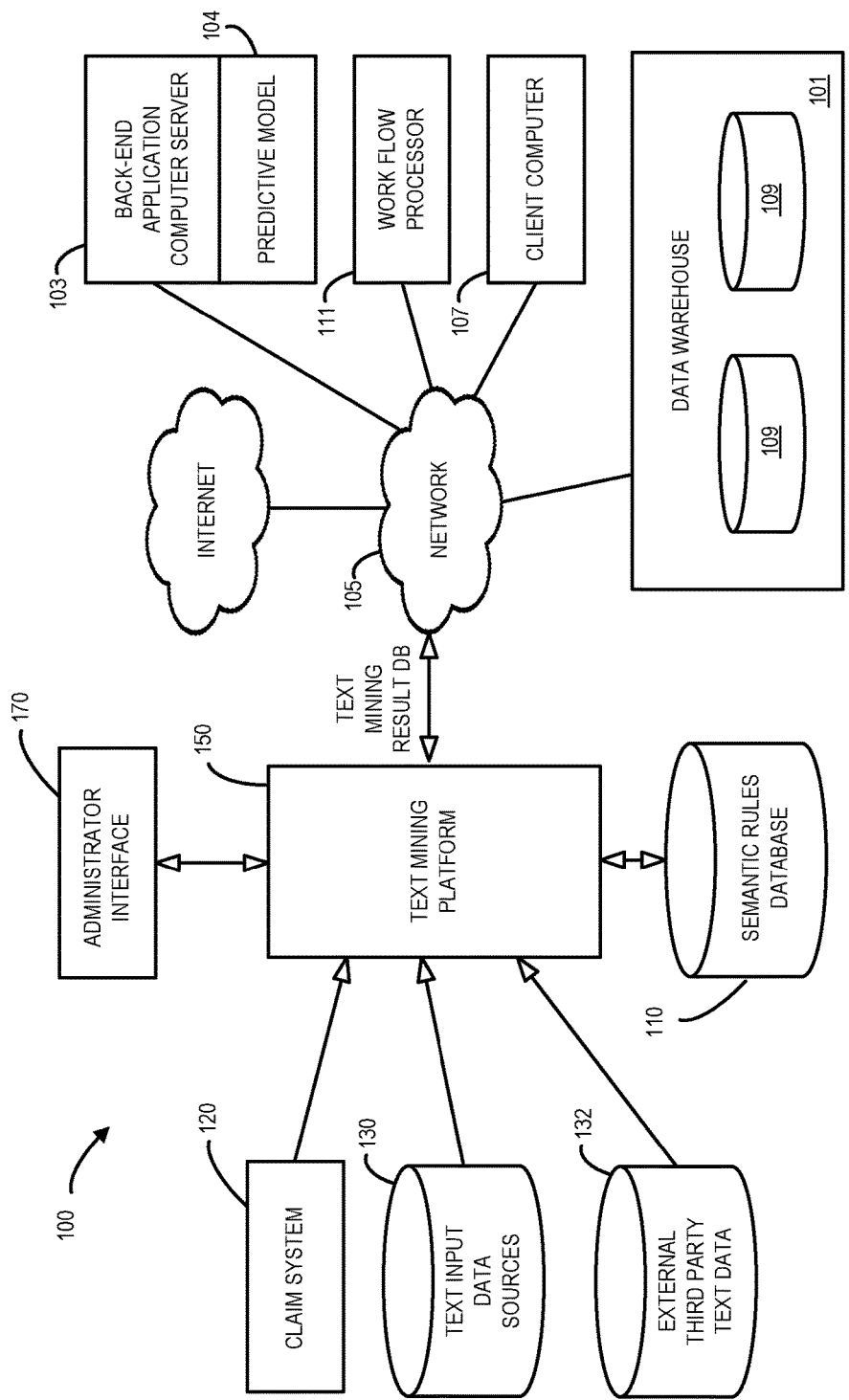
FIG. 1 is block diagram of a system according to some embodiments of the present invention.

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of electronic record analysis by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be transmitted to remote devices from a back-end application server and electronic records may be routed as appropriate, thus improving the overall performance of the system associated with message storage requirements and/or bandwidth considerations (e.g., by reducing the number of messages that need to be transmitted via a network). Moreover, embodiments associated with automatic predictions might further improve communication network performance, user interactions, real time chat or telephone call center responsiveness (e.g., by better preparing and/or allocating resources), the provisioning of medical services, the assignment of monetary funds as appropriate, etc.

An entity, such as an insurance company, may want to analyze or "mine" large amounts of data, such as text data. For example, an insurance company might want to analyze tens of thousands of insurance claim text files to look for patterns (e.g., a particular type of injury has occurred more frequently for employees who work in a particular industry). Note that an entity might analyze this data in connection with different types of applications, and, moreover, different applications may need to analyze the data differently. For example, the term "IV" might referent to an "Insured Vehicle" when it appears in an automobile accident report and to "Intra-Venous" when it appears in a medical file. It can be difficult to identify patterns across such large amounts of data and different types of applications. In addition, manually managing the different needs and requirements (e.g., different business logic rules) associated with different applications can be a time consuming and error prone process.

Further note that the cost of resolving many insurance claims is predictable with a great deal of certainty. For other claims, however, the confidence an insurer can have in predicting the total cost of resolving a claim may be much lower. The propensity for a claim to exceed its predicted total resolution cost, including medical costs, is referred to herein as "claim volatility."

Volatility in workers' compensation claims may manifest itself in several ways within the medical portion of a reserve. Medical conditions may worsen substantially. Treatments may result in unexpected complications. Injuries may carry low, but meaningful probabilities of secondary harm. For example, assume an employee suffers a back strain as a result of his employment. The typical conservative course of treatment would not require surgery or significant loss of time from work. In some cases, surgery and substantial loss of work occurs, and in a small portion of those cases, permanent and total disability may result with significant ongoing medical needs. In the low likelihood scenarios of additional surgery and permanent disability, the costs of the claim would be substantially higher.

Identification and triage of claims with high volatility potential would allow for improved alignment of resources towards higher risk claims, decrease the likelihood that injured parties suffer from low likelihood occurrences, and allow employers and insurers to reduce their exposure to the volatility those claims may present. Thus, there is a need in the art for methods and systems that use structured data and/or text mining to identify highly volatile claims. In addition, there is a need in the art for methods and systems of addressing these claims.

It may therefore be desirable to provide systems and methods using text mining to identify highly volatile data values. FIG. 1 is block diagram of a system 100 according to some embodiments of the present invention. In particular, the system 100 includes a text mining platform 150 that receives information from a semantic rules database 110, a claim system 120, one or more text input data sources 130 (e.g., internal to an insurance enterprise), and/or external third party text data 132 (e.g., reports issued by the National Highway Safety Board ("NHSB")). The text mining platform 150 might be, for example, associated with a Personal Computer ("PC"), laptop computer, an enterprise server, a server farm, and/or a database or similar storage devices. The text mining platform 150 may, according to some embodiments, be associated with a business organization or an insurance provider.

As used herein, devices, including those associated with the text mining platform 150 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

According to some embodiments, an "automated" text mining platform 150 may access semantic rules in the semantic rules database 110 to mine the information from the claim system 120 and/or the other text input data sources 130. As used herein, the term "automated" may refer to, for example, actions that can be performed with little or no human intervention.

The text mining platform 150 may store information into and/or retrieve information from the semantic rules database 110 and/or a text mining result database that is output to various external insurance applications (e.g., software applications or devices associated with subrogation, fraud detection, recovery factor analysis, etc.). The semantic rules database 110 may be a locally stored relational database or reside remote from the text mining platform 150. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical administrator interface 170 may provide an ability to access and/or modify the semantic rules database 110 via the text mining platform 150. The administrator interface 170 might, for example, let an administrator define terms, dictionaries, mapping rules, etc. associated with text mining. The data sources 130, 132 may be thought of as "publishers" of information to be consumed by the text mining platform 150, and any insurance applications may be considered "subscribers" to information created by the text mining platform 150. Moreover, note that the text mining platform 150 may operate asynchronously and/or independently of any insurance application.

Although a single text mining platform 150 is shown in FIG. 1, any number of such devices may be included. Moreover, various devices described herein might be combined according to embodiments of the present invention. For example, in some embodiments, the text mining platform 150 and semantic rules database 110 might be co-located and/or may comprise a single apparatus.

Figure 2:
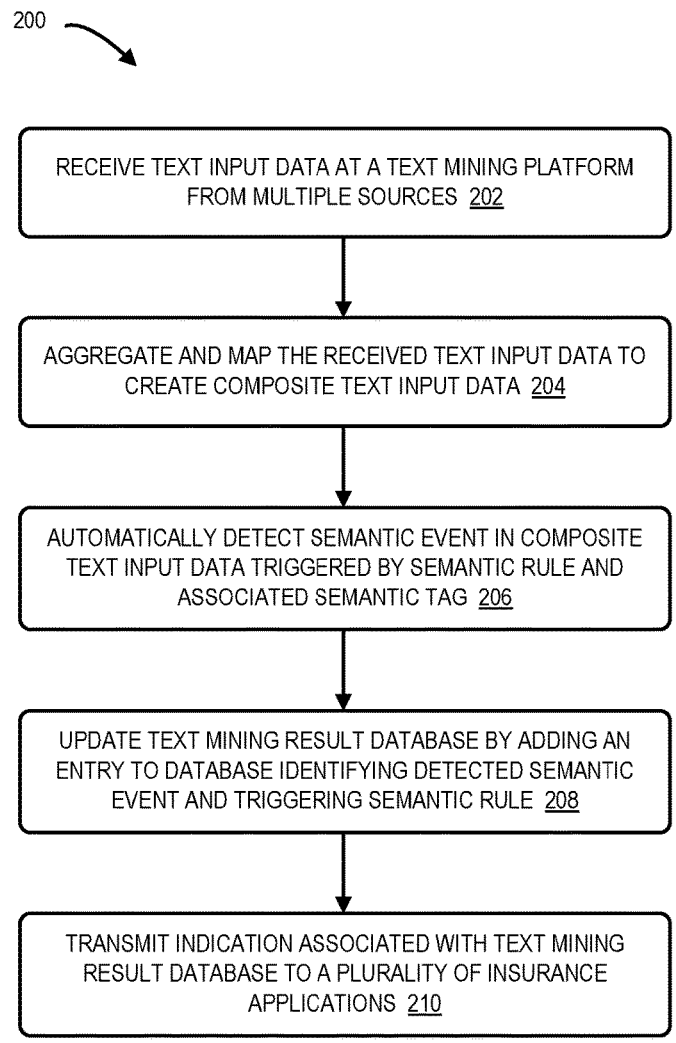
FIG. 2 illustrates a method in accordance with some embodiments of the present invention.

In this way, the system 100 may mine text in an efficient and accurate manner. For example, FIG. 2 illustrates a method that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, text input data is received at a text mining platform from multiple sources. For example, thousands of insurance claim files may be received on a periodic basis or in substantially real time. Although insurance claim files are described in connection with some embodiments herein, note that other types of information may also be received and/or analyzed. For example, the text input data might be associated with an insurance claim note, a medical report, a police report, social network data, a loss description, an injury description, a First Notice Of Loss ("FNOL") statement, a telephone call transcript (e.g., create via a voice recognition application), Optical Character Recognition ("OCR") data, third-party data, and/or a governmental agency (e.g., weather reports).

At 204, the received text input data is aggregated and mapped to create composite input text data. For example, the received text input data might be rearranged, converted into a standard format, fields may be mapped in accordance with a source identifier, abbreviations, words, and/or phrases may be modified as appropriate to a common usage, etc.

At 206, a semantic event may be automatically detected in the composite text input data triggered by a semantic rule and associated semantic tag. According to some embodiments, the semantic event may be associated with the triggering detection of a word, a phrase, a shorthand term, a course of action (e.g., use of a prescription drug), and/or an enterprise name (e.g., an insurance carrier name). The triggering semantic rule might be associated with, for example, a noun, a verb, a definition, a semantic tree, a named entity recognition rule, a root, a noun phrase, a prepositional phrase, and/or a verb phrase. According to some embodiments, the triggering semantic rule was previously defined by an administrator using a graphical user interface. In some cases, one or more pre-determined conditions may be applied to flag the detected semantic event (e.g., to reduce the number of semantic events to be eventually reported to insurance applications). For example, a pre-determined condition may require that a word or phrase must be detected a pre-determined number of times or within a pre-determined proximity of another word or phrase.

A text mining result database may be updated at 208 by adding an entry to the database identifying the detected semantic event and the triggering semantic rule (note that, if applicable, only flagged events may result in a new entry be created in the database). The added entry might, for example, include a file note identifier, an insert date, a text source, a rule identifier, and/or a line of business.

At 210, an indication associated with the text mining result database may be transmitted to a plurality of insurance applications. The insurance applications might be associated with, for example, a workers' compensation claim, a personal insurance policy, a business insurance policy, an automobile insurance policy, a home insurance policy, a sentiment analysis, insurance event detection, a cluster analysis, a predictive model, a subrogation analysis, fraud detection, a recovery factor analysis, large loss and volatile claim detection, a premium evasion analysis, an insurance policy comparison, an underwriting decision, and/or indicator incidence rate trending application. Note that the transmitted indication might be used to trigger an insurance application (e.g., by triggering a fraud detection analysis) and/or update an insurance application (e.g., by updating a variable or weighing factor of a predictive model).

In some cases, the transmitted indication might be associated with generation of a volatility indication for an insurance claim (or a set of insurance claims). For example, referring again to FIG. 1, the system 100 further contains a data warehouse 101, a back-end application computer server 103, a predictive model 104, a network 105, a client terminal 107, and a workflow processor 111. The data warehouse 101 is the main electronic depository of an insurance company's current and historical data. The data warehouse 101 includes one or more interrelated databases 109 that store information relevant to insurance data analysis. The interrelated databases 109 store both structured and unstructured data. Structured data includes data stored in defined data fields, for example, in a data table. Unstructured data includes raw information, including, for example, computer readable text documents, document images, audio files, video files, and other forms of raw data. Note that some or all of the data in the data warehouse 101 might be analyzed by the text mining platform 150.

Databases in the interrelated databases 109 may for example store data in a relational database, in various data fields keyed to various identifiers, such as, without limitation, customer, data source, geography, or business identifier (such as Standard Industry Classification ("SIC") code). The information stored in the data warehouse 101 is obtained through communications with customers, agents, sensors monitoring insured property, vendors, data and text mining software applications, and third party data providers and investigators. In other implementations, use of the data warehouse can be replaced with a more traditional database application without departing from the scope of the invention.

The back-end application computer server 103 includes one or more computer processors, a memory storing the predictive model 104, and other hardware and software for executing the predictive model 104. More specifically, the software may be computer readable instructions, stored on a computer readable media, such as a magnetic, optical, magneto-optical, holographic, integrated circuit, or other form of non-volatile memory. The instructions may be coded, for example, using C, C++, JAVA, SAS or other programming or scripting language. To be executed, the respective computer readable instructions are loaded into RAM associated with the back-end application computer server 103.

The predictive model 104 is used by the back-end application computer server 103 to estimate the likelihood that a claim will exhibit increased volatility in comparison to other claims. Volatility may be measured in various ways. In one implementation, the volatility estimated is the volatility of medical payments incurred in relation to a claim. A claim is considered to be volatile if it has the potential to result in significant linear or non-linear increases in medical expenditures. In other implementations, volatility may be measured in other ways. For example, in various alternative embodiments, instead of focusing only on medical costs, volatility can viewed as the potential for significant non-linear increases in other individual cost components, or combinations thereof, associated with a claim, including but not limited to medical review and management, third party investigation expenses, and claim oversight costs. In alternative embodiments, the back-end application computer server may evaluate the likelihood that costs associated with a claim will be stable, rather than volatile.

The predictive model 104 may be a linear regression model, a neural network, a decision tree model, or a collection of decision trees, for example, and combinations thereof. The predictive model 104 may be stored in the memory of the back-end application computer server 103, or may be stored in the memory of another computer connected to the network 105 and accessed by the back-end application computer server 103 via the network 105.

The predictive model 104 preferably takes into account a large number of parameters, such as, for example, characteristics of electronic records (e.g., each electronic record being associated with an insurance claim). The evaluation period may be, for example, and without limitation, the first 45, 90, or 120 days after a First Notice of Loss ("FNOL") is received by the insurance company. Alternatively, the evaluation periods may be regular periods, for example, months, quarters, or years. Also note that scoring might be performed, according to some embodiments, whenever there is an event of interest to the model (a new invoice, payment made, etc.)—this might be on days 180, 367, 452 for one claim and days 30, 375, 431 for another claim.

Some examples of characteristics that might be considered in connection with a volatility prediction include medical invoice totals for the following (during evaluation periods): pharmacy; doctor's office; inpatient hospital; outpatient hospital; emergency room; ambulatory surgical center; nursing facility; ambulance; inpatient psychiatric facility; and community mental health center. Other examples of characteristics might include visit counts of the following types (during evaluation periods): emergency; critical care; diagnostic; physical therapy; surgery; anesthesia; and radiology. Other examples of characteristics might include whether primary injury is one of the following types: nervous, back sprain, fracture, dislocation, open wounds, musculoskeletal, compensation coverage code (varies by state), network penetration (in network verses out of network medical spend), estimated incurred (reserved amount) at end of evaluation period, estimated total medical spend, accident state, claimant age, nature of benefit code, business unit and business group, estimated indemnity payment, and prior claimant injuries and/or medical conditions.

In some embodiments, the predictive model 104 is trained on a collection of data known about prior insurance claims and their ultimate disposition, including, for example, and without limitation, the types of costs described above. In various embodiments, the particular data parameters selected for analysis in the training process are determined by using regression analysis or other statistical techniques, such as posterior probability modeling, known in the art for identifying relevant variables in multivariable systems. The results of such analysis can also be used to inform claims adjusters as to the importance of various types of data to encourage inclusion of more data related to the more relevant parameters in free text fields or structured data fields of claims reporting forms. One particular predictive model suitable for use as the predictive model 104, and methods for generating such a predictive model are described further in relation to FIGS. 3A-7.

Once the text mining platform 150 has analyzed the data, the system may determine a quantitative "target variable" that may be used to categorize a collection of observed claim data into those that exhibit volatile behavior and those that do not. For example, a target variable may be the result of a function, which can then be compared against a threshold value. Claims that have a target variable value that exceeds the threshold value may be considered stable or volatile, depending on how function and threshold are defined. An illustrative process for determining a volatility target variable is described in relation to FIG. 4. The actual predictive model is then created from a collection of observed past claim data and the target variable. In a preferred embodiment, the predictive model has the form of one or more decision trees. The decision tree(s) may be used to predict the volatility of future claim data. An illustrative process for creating the decision tree(s) is described in relation to FIG. 5. An illustrative method for using the decision tree(s) to generate a volatility likelihood prediction is described in relation to FIG. 6. Finally, the predictive model may be validated.

In the context of worker's compensation insurance, volatility is a measure that captures unexpected increases in claim transactions. Claim transactions may be, for example, monthly medical expenditures associated with a claim. Medical expenditures often constitute the component of claim costs that is most likely to exhibit volatility in a worker's compensation claim. Although the model generation process is described below based on monthly medical expenditure data, it is understood that other types of claim transactional data may also be used. Volatile behavior includes, but is not limited to, non-linear growth, including, for example, sudden spikes, exponential, growth, and/or stepwise increases, in the monthly medical expenditures associated with a claim.

Figure 3A:
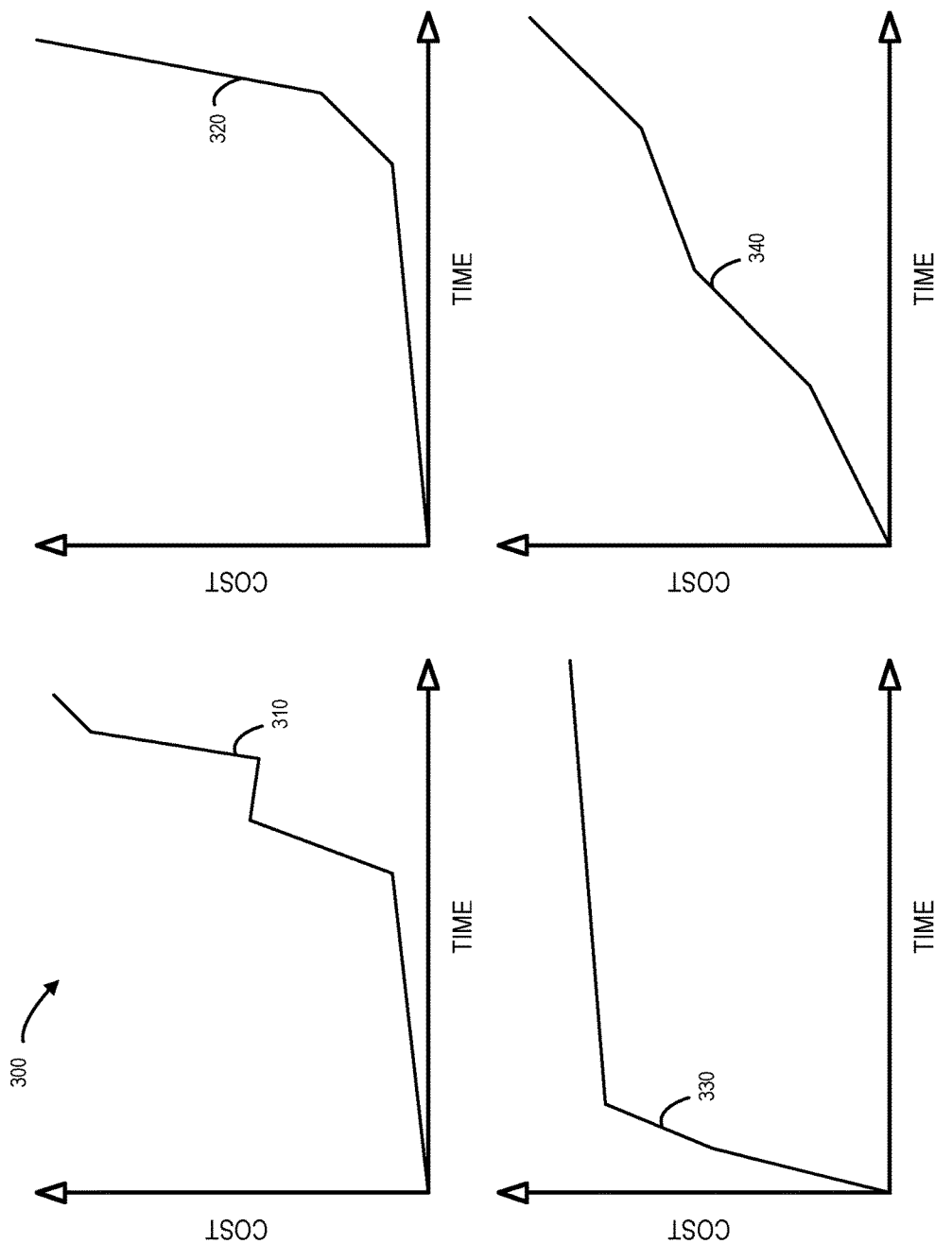
FIG. 3A illustrates volatility graphs according to some embodiments described herein.

FIG. 3A shows graphs 300 of monthly medical expenditure of illustrative claims that exhibit different types of volatile behavior. The graphs 300 might, for example, show the amount of medical expenditure per month of the claim over a ten year period. Spikes and may indicate unexpected increases in monthly medical expenditure. These increases in spending may, for example, correspond to a costly surgical procedure, unexpected complications arising from routine treatment, for example, infection, or another medical cost that may be out of the norm. The overall exponentially increasing trend exhibited by the graphs 300 may, for example, reflect an injured party's progressively worsening medical condition. In the example of FIG. 3A, the upper two graphs 310, 320 might be associated with claims that exhibit volatile patterns. The lower two graphs 330, 340 might be associated with claims that exhibit non-volatile patterns. In some cases, volatility may be considered a measure of the surprise medical and indemnity exposure of a claim. The volatility of a claim may be related to the predictability of the payments (e.g., how linear they are). Looking at the historical medical spend, the system can classify certain patterns as volatile. Note that a claim might be considered volatile whenever a payout is not expected. That is, the refresh may be of less concern as compared to the path taken. For example, if the claim associated with the bottom right graph of FIG. 3A was expected to flatten early in the claim's life—but the insurance enterprise instead continued to increase payouts over time, then the claim may be classified as "volatile."

Figure 3B:
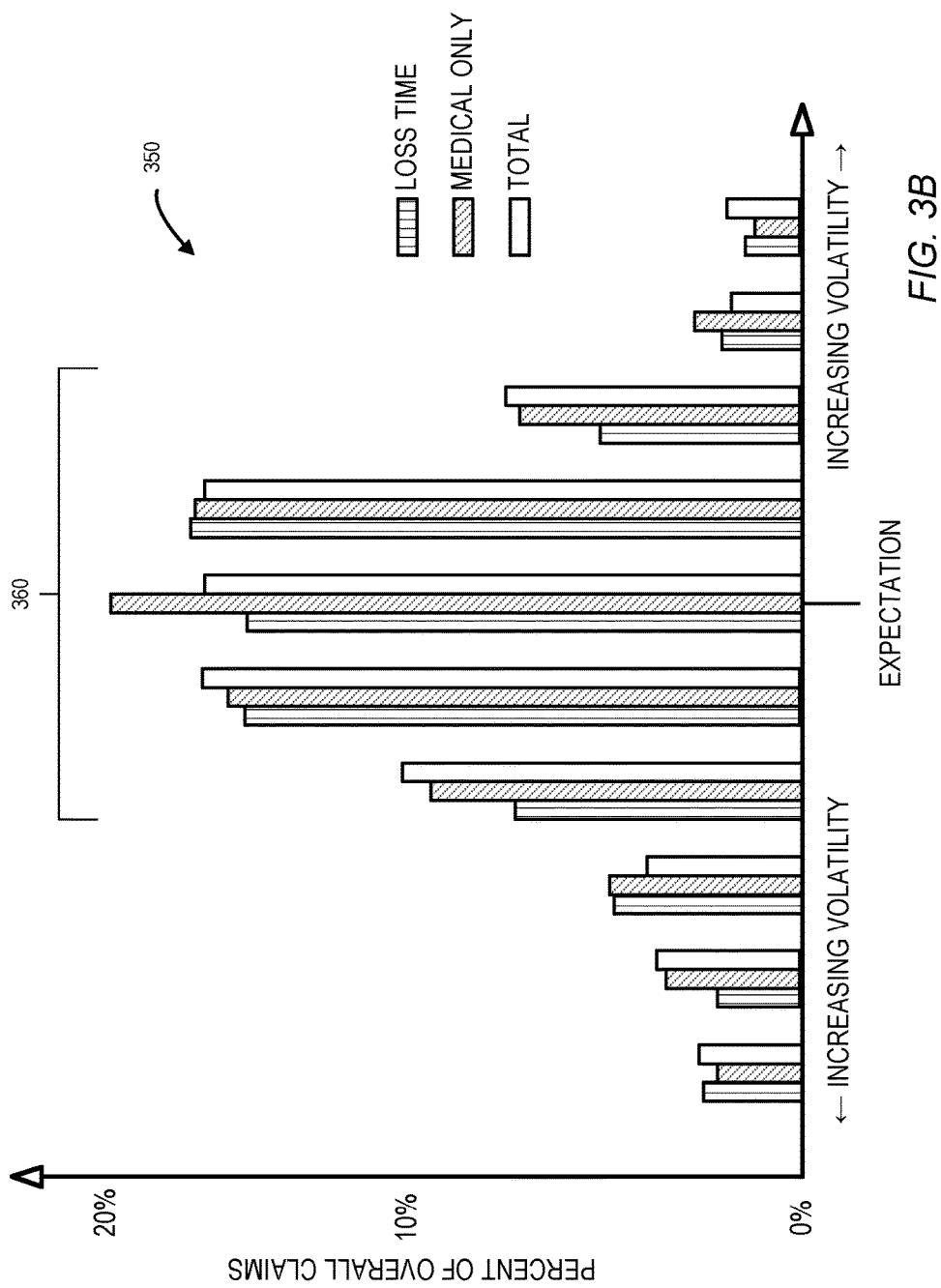
FIG. 3B is a graph showing a distribution of actual claim severity relative to an expected severity in accordance with some embodiments.

FIG. 3B is a graph 350 showing a distribution of actual claim severity relative to an expected severity in accordance with some embodiments. In particular, some more predictable claims 360 will have actual costs that closely match the loss time, medical only, and/or total loss predictions (the expected losses). Other claims, however, will represent "tails" that deviate from predictions (such as by a factor of five or more times). For example, those in the graph 350 to the left of the predictable claims 360 might have resulted in substantially lower costs as compared to the predictions (and be increasingly volatile as they move away from the expected losses) while those in the graph 350 to the right of the predictable claims 360 might have resulted in substantially higher costs (and also be increasingly volatile as they move away from the expected losses). The system may tranche claims into high, medium, and low volatility to better allocate funds and/or guide underwriting pricing decisions.

Figure 4:
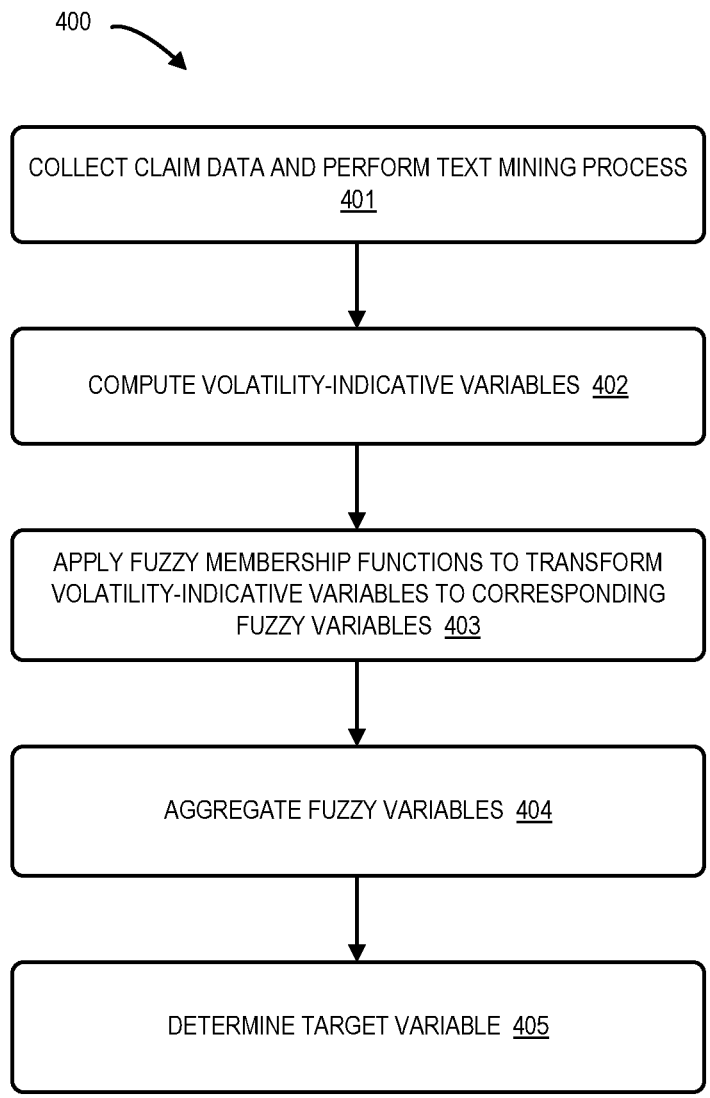
FIG. 4 is a flow chart of a method for deriving a target variable for classifying prior claims with respect to their volatility in accordance with some embodiments.

FIG. 4 is a flowchart of a method of determining the target variable for volatility. As mentioned above, the target variable is a quantitative function describing a level of volatility. In one embodiment of the invention, it may be used to categorize the past behavior of a claim as volatile or non-volatile in a binary fashion. In other embodiments, it may assign to the past behavior of a claim a degree of volatility that is more finely defined, such as high, medium, or low volatility. In such embodiments, the target variable value may be compared against multiple thresholds to properly classify an associated claim.

Defining the target variable begins, at step 401, by collecting monthly medical expenditure data for each of a group of claims. In one embodiment, the monthly medical expenditure data for each claim may include expenditure data for a time period ranging from one month to 15 years or more. The claims may be currently pending claims and/or historical claims that have finally resolved and been closed. The monthly medical expenditure of each claim may take the form of a time series, such as the time series plotted in the graphs 300 of FIG. 3A. Note that the collected data might include any other type of data, including data identified by the text mining platform 150.

At step 402, the expenditure data for each claim or for groups of claims is analyzed to produce values for volatility-indicative variables, i.e., statistical characteristics deemed to be evidence of volatility. Illustrative volatility-indicative variables include, in one implementation, the mean ($\mu$) monthly medical expenditure for a claim, the semi-quartile range ("SQ") of monthly medical expenditures for the claim, and correlation coefficient ($\rho$) of the monthly medical expenditure of each claim over a particular time interval (indicating the degree to which medical expenditures in a given month correlate to the expenditures in one or more preceding months). At step 403, fuzzy membership functions may be applied to the relationship between each of the statistical parameters and "the degree of volatility" as seen in the historic data. Fuzzy membership functions are a subset of fuzzy logic operations. Such functions are described in Fuzzy Sets, by Zadeh, L. A., Vol. 8, 1965, 338-353, which is incorporated herein by reference. For example, the mean, semi-quartile range, and correlation coefficient of the monthly medical expenditure of a claim may be used to form fuzzy variables $\mu$fuzzy, SQfuzzy, and $\rho$fuzzy. At step 404, the fuzzy variables are aggregated to determine a single variable that is representative of degree of volatility. One example of a suitable aggregation function is the minimum of the individual fuzzy variable values. At step 405, the target variable value is decided based on threshold values for the aggregated fuzzy variable. For example, in one implementation, claims with an aggregate fuzzy score of more than 0.135 are considered volatile and the remaining claims are considered non-volatile. The target variable for a claim was assigned a value of 1 for volatile claims and 0 for non-volatile claims. Note that any other approach might be taken to determine variables representative of volatility, etc.

The specific target variable (including fuzzy membership functions, an aggregation operation, and a corresponding threshold) used in generating the predictive model is chosen by applying multiple target variables to several training data sets. The target variable may by, according to some embodiments, selected according to the minimax criterion. That is, the selected target variable is that which minimizes the maximum error in application of the target variable to the training data sets. Each set of training data consists of medical expenditure data for multiple claims. The claims in the training data sets are manually prescreened for volatility by a human expert. An error occurs when the volatility category of the claim as determined by the target variable is different from that determined by the human expert. In some implementations, the human expert identifies each claim as either volatile or stable. In such implementations, all misidentifications made by the applying a potential target are weighted equally. In other implementations, the human expert also assigns each claim a degree of volatility. In such implementations, the magnitude of an error associated with a misidentification is based on the degree of volatility assigned to the claim by the human expert. For example, misidentifying a highly volatile claim as stable would yield a larger error than the misidentification of a slightly volatile claim. Once the fuzzy membership functions and aggregation operations have been determined, a sample of claim trends with known volatility may be used to validate the effectiveness of the target variable.

The process described by flowchart 400 retrospectively describes the volatility of a set of observed past claims. In contrast, flowchart 500 of FIG. 5 details the process of creating a predictive model that may be used to predict future volatility in a claim. In one embodiment of the invention, the predictive model generated according to the method depicted in FIG. 5 includes a collection of decision trees. The parameters used in the decision tree models may include some or all of the electronic record characteristics listed above.

According to the flowchart 500, the process of building a predictive model begins with collecting a set of training data, at step 501. The training data set consists of data for previously handled claims. Note that the collected data might include any other type of data, including data identified by the text mining platform 150. At step 502, the volatility of each claim in this data set may be determined by computing the claim's target variable as described in relation to FIG. 4. The claims in the training data set are categorized into a volatile and nonvolatile group. Preferably, a large number of claims, for example, more than 10,000 or more than 100,000 are included in the training data set.

At step 503, a number, N, of stratified samples is generated from the training data set. The samples are stratified in that each sample has the same proportion of volatile to nonvolatile claims. In one embodiment, the volatile group of claims may be oversampled to create samples in which the percentage of claims that are volatile in each sample exceeds the percentage of volatile claims in the full training data set. For example, experimental data suggests that on the order of 1% of claims demonstrate high levels of volatility. However, to adequately train the collection of decision trees referred to above, it may be beneficial to ensure 10% of the claims in each sample are volatile. Thus, each volatile claim may be included in multiple samples.

For each of the N samples generated in step 503, a decision tree is generated from stratified samples at 504. In one implementation, each leaf node in each decision tree has an associated likelihood value, for example, a posterior probability, that a claim will exhibit volatility in the future. The output of processing a claim with the decision tree is the likelihood value associated with the leaf node into which the claim is categorized. The N decision trees may be generated independently from each other and may be formed using one or more algorithms known in the art. There are a number of such methods for generating decision trees from a set of training data, including Gini index and entropy reduction based methods. These methods are described in, for example, Barry DeVille (2006), Decision Trees for Business Intelligence and Data Mining: Using SAS Enterprise Miner, SAS Press Series. Each of the N decision trees may be generated using a different or the same method. The particular tree generation method used for each sample may be selected or optimized based on subsequent model validation results. For example, each of the trees may be generated according to two or more models. Then, various combinations of the trees may be compared to see which yields the best results upon validation. The purpose of generating multiple trees from multiple data samples is to combat the tendency of decision tree models to change substantially in response to small changes in the training data. The predictive model also includes an aggregation function that can be applied to the outputs of the decision trees in the model to yield a final volatility likelihood score. In various implementations, the aggregation function serves to aggregate posterior probabilities expressed by individual decision trees. For example, suitable aggregation functions include, for example, voting methods that are proportion-based or average-based. In one particular implementation, the aggregation function is a simple averaging of posterior probabilities from the N decision trees.

Figure 5:
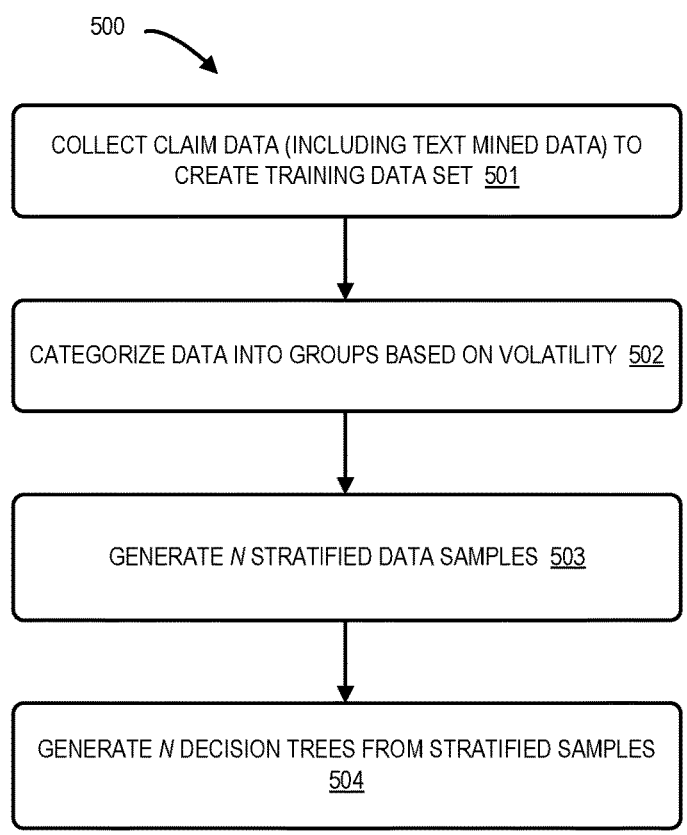
FIG. 5 is a flow chart of a method of training a volatility predictive model according to some embodiments.
Figure 6:
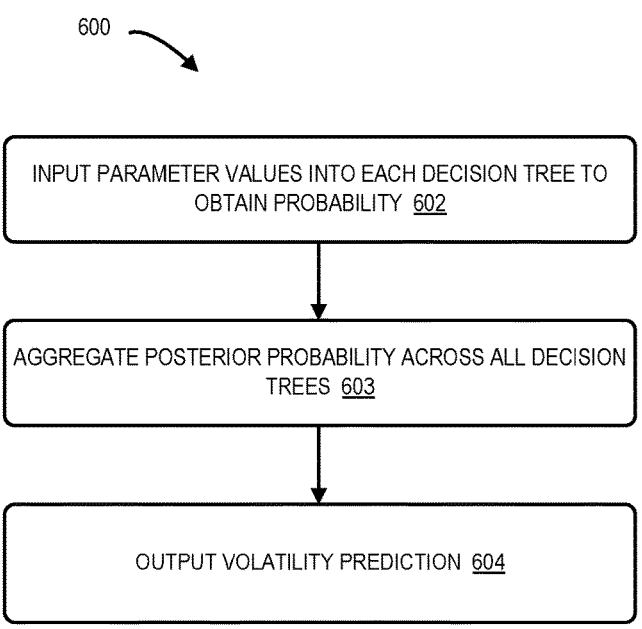
FIG. 6 is a flow chart of a method of applying a trained volatility predictive model in accordance with some embodiments.

FIG. 6 is a flowchart of a method 600 of using the predictive model generated in FIG. 5 to obtain a future volatility prediction on a particular test claim. At step 602, values for the decision tree parameters for the test claim are input into the decision trees. The decision trees are processed to produce likelihoods that the test claim will be volatile (as defined by the target variable). At step 603, the likelihoods from the decision trees are aggregated to produce an overall likelihood score, as described above. At step 604, the aggregated likelihood score is output by the predictive model for further processing.

In one example, a predictive model was generated and validated in accordance with the methodology described above. The model was generated using a sample data set including several hundred thousand historical claims. Approximately 1% of these claims were identified as being volatile based on the classification methodology described above in relation to FIG. 4.

Ten stratified samples were obtained from the training data set using a bootstrap sampling methodology with replacement. The group of volatile claims was oversampled so that the ratio of volatile to nonvolatile claims in each stratified sample was one to ten. Ten decision trees were generated using these ten stratified samples. Seventy percent of the claims in each sample set were used to train a respective predictive model. The remaining thirty percent of the claims were used to validate that model. To generate each tree, one tree was selected from multiple candidate trees generated using various combinations of parameters and decision tree methodologies. In this specific example, six of the trees were selected to be Gini index based trees and the remaining trees were entropy reduction based trees. The volatility likelihood values produced by the trees were aggregated together by computing their mean.

Next, an eleventh sample of about ten percent of the total sample claims, also selected using replacement, was obtained. 70% of these claims were used to train the aggregate model. The remaining 30% were used to conduct a final validation of the model.

The model generation and application processes described above are merely illustrative methods for generating and applying a model for use in the process described herein. Other model generation and respective application processes as well as other types of models may be employed without departing from the scope of the invention. For example, in alternative implementations, the predictive model 104 can be based on expert systems or other systems known in the art for addressing problems with large numbers of variables. The model may be generated by the back-end application computer server 103, another computing device operated by the insurance company, or by a computing device operated by a third party having access to the insurance company's prior claims data.

The predictive model 104 may be updated from time to time as an insurance company receives additional claim data to use as a baseline for building the predictive model 104. The updating includes retraining the model based on the updated data using the previously selected parameters. Alternatively, or in addition, updating includes carrying out the model generation process again based on the new data.

Referring back to FIG. 1, the network 105 enables the transfer of claim data between the data warehouse 101, the back-end application computer server 103, the client computer 107, the business workflow processor 111, and third party suppliers or vendors of data. The network includes a local area network as well as a connection to the Internet.

The client terminal 107 includes a computer that has a CPU, display, memory and input devices such as a keyboard and mouse. The client terminal 107 also includes a display and/or a printer for outputting the results of the analysis carried out by the predictive model 104. The client terminal 107 also includes an input module where a new claim may be filed, and where information pertaining to the claim may be entered, such as a notice of loss, for example. In addition to being implemented on the client terminal 107, or in the alternative, the input module may be implemented on other insurance company computing resources on the network 105. For example, the input module may be implemented on a server on the network 105 for receiving claims over the Internet from one or more websites or client applications accessed by insurance company customers, company agents, or third party preprocessors or administrators. The input module is preferably implemented as computer readable and executable instructions stored on a computer readable media for execution by a general or special purpose processor. The input module may also include associated hardware and/or software components to carry out its function. For example, for implementations of the input module in which claims are entered manually based on the notice of loss being received telephonically, the input module preferably includes a voice recording system for recording, transcribing, and extracting structural data from such notices.

The workflow processor 111 includes one or more computer processors and memory storing data pertaining to claim handlers, supervisors, medical reviewers, medical providers, medical provider supervisors, private investigators, and other vendors. Stored information may include, without limitation, experience, skill level, reputation, domain knowledge, and availability. The workflow processor 111 also includes other hardware and software used to assign a claim to at least one of a claim handler, supervisor, medical reviewer, medical provider, medical provider supervisor, legal services provider, and independent investigator by the back-end application computer server 103. For example, in one implementation, the workflow processor 111 assigns more aggressive medical care and review to claims having higher likelihoods of being volatile claims, thereby applying resources to those that might benefit the most. The level of medical care and/or review management may be tiered. Medical care and review may include, without limitation, review and/or treatment from physical therapists, occupational therapists, vocational rehabilitation providers, physicians, nurses, nurse case managers, psychologists, alternative medical practitioners, chiropractors, research specialists, drug addiction treatment specialists, independent medical examiners, and social workers. The selection of the level of review and/or care may include a selection of a particular provider having the skills, experience, and domain knowledge applicable to the claim, an aggressiveness of treatment or review, and/or frequency of treatment or review. The workflow processor 111 or the back-end application computer server 103 may also have software configured to determine a general expense tolerance for a claim, i.e., a tolerance for expending resources on costs not associated with compensating a claimant or covered individual.

As an alternative to the illustrated FIG. 1, the physical components of the data warehouse 101, client computer 107, back-end application computer server 103, predictive model 104 and workflow processor 111 may be housed within the same computing device. As another alternative, the functionality of the back-end application computer server 103 and workflow processor 111 may be implemented on a single computing device.

Figure 7A:
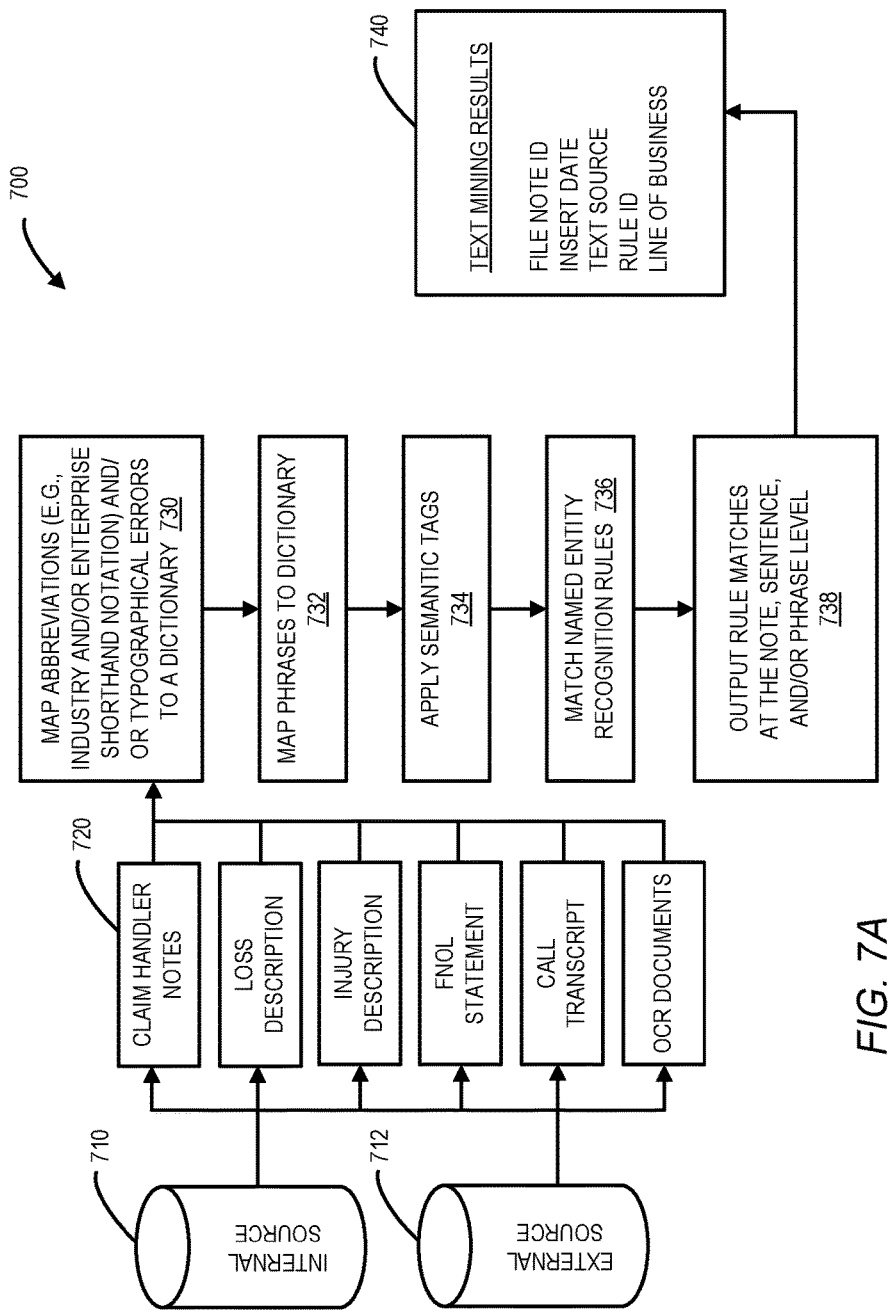
FIGS. 7A and 7B comprise a process overview in accordance with some embodiments.
Figure 7B:
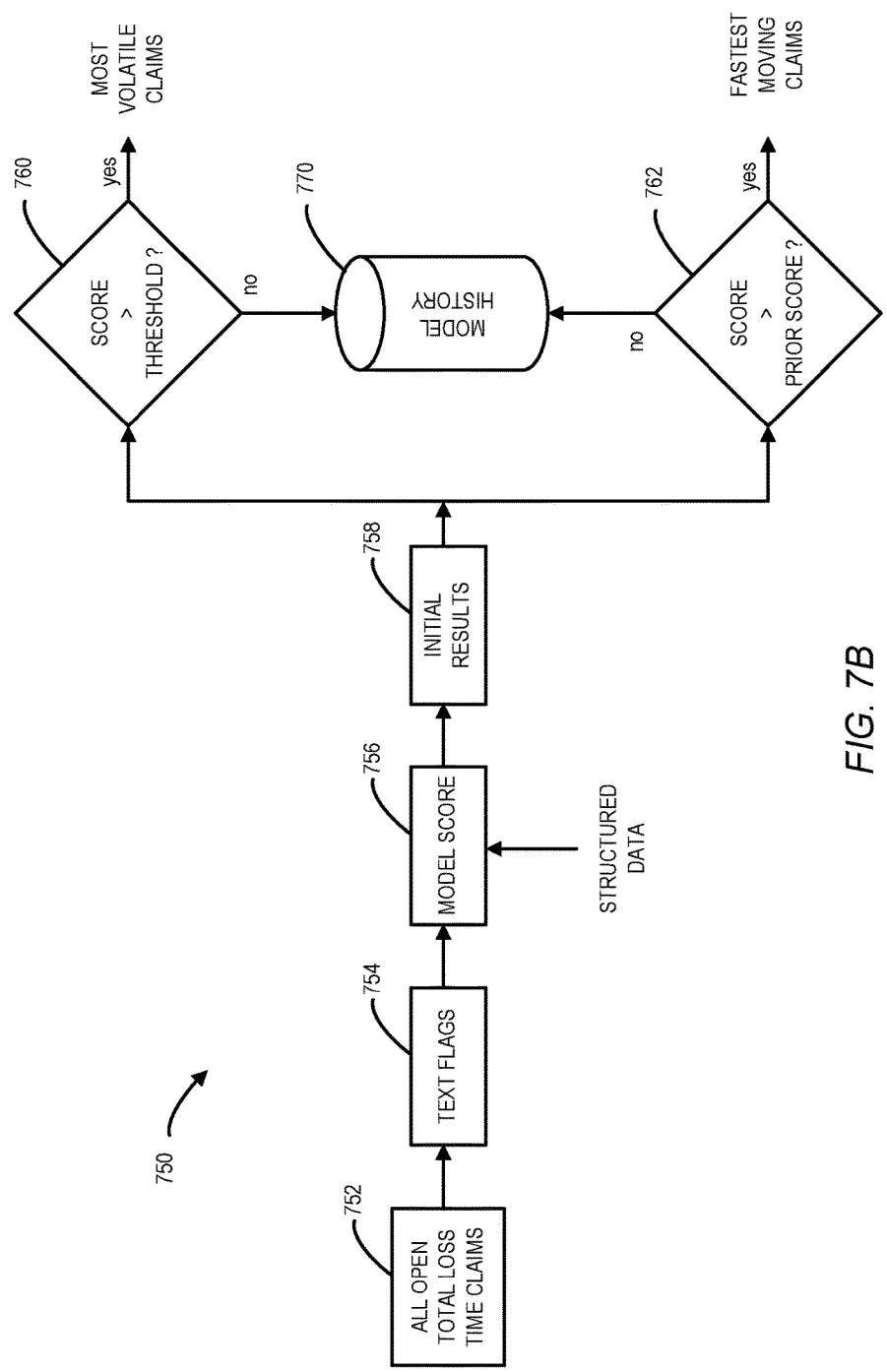

FIGS. 7A and 7B comprise a process overview in accordance with some embodiments. In particular, FIG. 7A illustrates a data flow 700 according to some embodiments of the present invention. Initially, text data may be pulled from one or more internal sources 710 and/or external sources 712 (e.g., on a daily basis). The pulled data may be associated with, for example, various insurance applications and/or data types 720, such as claim handler notes, loss descriptions, injury descriptions, FNOL statements, call transcripts, and/or OCR documents. Note that other types of information (e.g., reports from a highway safety board) might also be processed.

The pulled data may then be processed in accordance with any of the embodiments described herein (e.g., in connection with a master domain). In particular, abbreviations (e.g., associated with industry and/or enterprise-specific shorthand and jargon) and/or typographical errors may be mapped to a dictionary 730, phrases may be mapped to a dictionary 732, semantic tags may be applied 734, and/or named entity recognition rules may be matched 736. As a result of such processing, rule matches may be output at the note, sentence, and/or phrase level 738. For example, entries or records may be inserted into a text mining results database 740 (e.g., including fields such as a file note identifier, date of insertion, a text source, etc.). Note that a single input file or record might result in multiple results being inserted into the database.

According to some embodiments, such a data flow 700 may allow for the use of common domain dictionaries (e.g., including shorthand terms, common prescriptions, and/or insurance carrier names). Moreover, a composite named entity recognition rules library may provide for daily processing of text fields and rule changes may be tracked over time for analysis. In addition, performance monitoring might be performed in connection with indicator incidence rate trending and new rules can be introduced with minimal code changes. According to some embodiments, a batch process may create a history for new and/or changed rules associated with the data flow 700.

According to some embodiments, the text mining associated with the data flow is a "big data" activity that may use machine learning to sift through large amounts of unstructured data to find meaningful patterns to support business decisions. As used herein, the phrase "big data" may refer to massive amounts of data that are collected over time that may be difficult to analyze and handle using common database management tools. This type of big data may include business transactions, email messages, activity logs, and/or machine-generated data. In addition, data from sensors, unstructured text posted on the Internet, such as blogs and social media, may be included in embodiments described herein.

According to some embodiments, the text mining performed herein may be associated with hypothesis testing. For example, one or more theories may be provided (e.g., "the presence of a landlord increases chances of subrogation," "a pre-existing injury is a red flag for fraud," and/or "diabetes is a comorbidity that increases the duration of lost time claims"). Knowledge engineering may then translate common notation terms, correct typographical errors, and create smart tags for industry and scenario specific business context analysis. According to some embodiments, Natural Language Processing ("NLP") may parse text streams into phrases and Named Entity Recognition ("NER") rules may identify important concepts that are used to augment other structured data elements as predictor variables in models.

The NER rules may be stored in an NER rule library and may include individual indicators. For example, indicators associated with a subrogation analysis might include the following words or phrases: animal bite, attorney, carrier, contractor, landlord, lawsuit, low subrogation, motor vehicle accident, no subrogation, off premises, responsible party, self-inflicted, third party, and/or zero paid. As other examples, indicators associated with a fraud detection analysis might include the following words or phrases: disputed injury, no evidence, pre-existing condition, prior history, recent hire, terminated, unhappy, un-witnessed injury, claimant lacks documentation, claimant not employee, claimant paid in cash, no Social Security number, employer paid un-reported bill, employer won't confirm information, hazardous material, and/or excluded business. As still other examples, indicators associated with a recovery factor analysis might include: alcohol, complications, diabetes, high blood pressure, narcotics, pre-existing condition, obesity, osteoarthritis, smoking, substance abuse, and/or elderly care.

In some embodiments, the text mining described herein may be associated with insight discovery wherein unsupervised data mining techniques may be used to discover common patterns in data. For example, highly recurrent themes may be classified, and other concepts may then be highlighted based on a sense of adjacency to these recurrent themes. In some cases, cluster analysis and drilldown tools may be used to explore the business context of such themes. For example, sentiment analysis may be used to determine how an entity is currently perceived and/or the detection of a real-world event may be triggered (e.g., it might be noted that a particular automobile model is frequently experiencing a particular unintended problem).

FIG. 7B illustrates a process 750 that might, for example, be used to calculate a volatility score for all open lost time claims 752 each month. Text flags 754 might be identified as described in connection with 7B. According to some embodiments, static claim variables like age, geography, profession, wage levels, etc. may be considered. Malleable elements, like ICD-9 diagnoses, prescription drugs, and procedures may change the volatility score of a claim over time. Note that some procedures, medications, and diagnoses may indicate a worsening medical condition. At 756 a model score is generated (including any available "non-text-mined" or structured data variables as appropriate), and an initial result may be provided at 758.

If the current model score exceeds a pre-determined threshold value at 760, the claim might be output as being one of the most volatile claims. If not, the current claim score may be stored into a model history database 770. If the current model score exceeds a prior model score at 762 (e.g., by at least a pre-determined amount), the claim might be output as being one of the fastest moving claims. If not, the current claim score may be stored into the model history database 770.

Figure 8A:
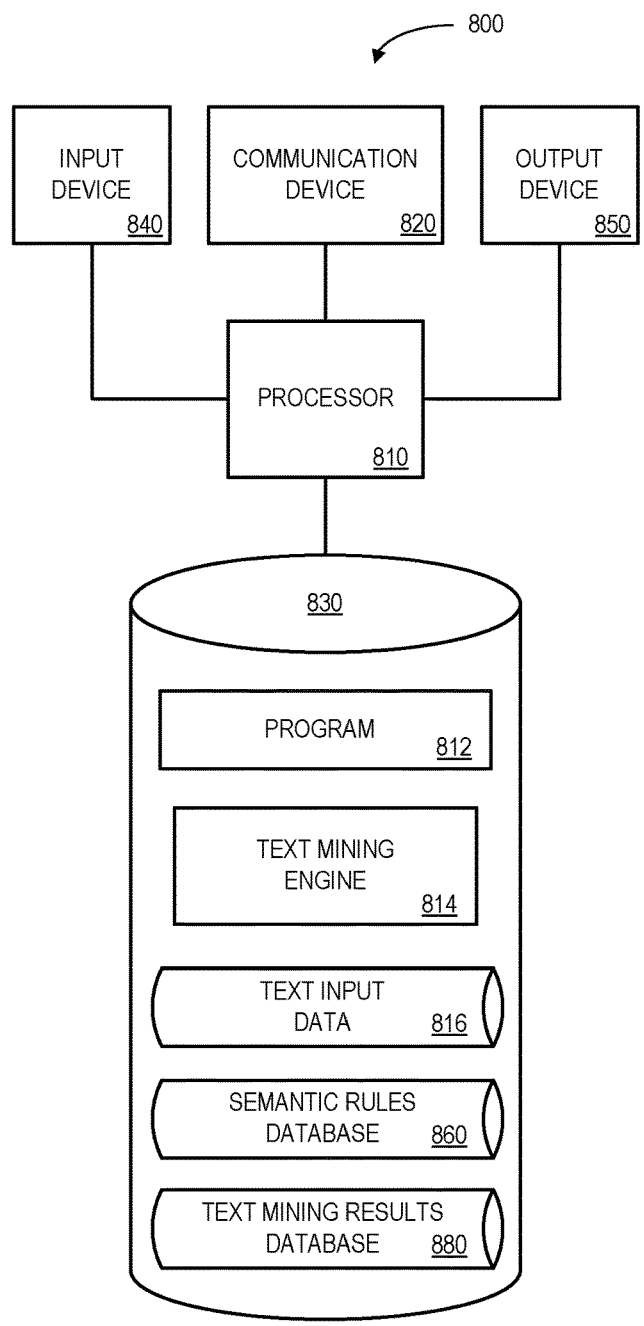
FIG. 8A is block diagram of a platform according to some embodiments of the present invention.

The embodiments described herein may be implemented using any number of different hardware configurations. For example, FIG. 8A illustrates a platform or apparatus 800 that may be, for example, associated with the text mining platform 150 and/or the back-end application computer server 103 of FIG. 1. The apparatus 800 comprises a processor 810, such as one or more commercially available Central Processing Units ("CPUs") in the form of one-chip microprocessors, coupled to a communication device 820 configured to communicate via a communication network (not shown in FIG. 8). The communication device 820 may be used to communicate, for example, with one or more text sources and/or insurance applications. The apparatus 800 further includes an input device 840 (e.g., a mouse and/or keyboard to define semantic rules) and an output device 850 (e.g., a computer monitor to display reports and volatility results).

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 812 and/or a text mining engine 814 for controlling the processor 810. The processor 810 performs instructions of the programs 812, 814, and thereby operates in accordance with any of the embodiments described herein. For example, the processor 810 may initiate a process such that text input data for an electronic record are aggregated and mapped to create composite text input data. A semantic event in the composite text input data may be automatically detected by the processor 810, and a text mining result database may be updated by adding an entry identifying the detected semantic event and a triggering semantic rule. An indication for the electronic record may then be transmitted by the processor 810 to a back-end application computer server that also determines at least one parameter corresponding to a characteristic of the electronic record. The processor 810 may execute a computerized predictive model to predict a future performance characteristic indicator (e.g., associated with volatility) for the electronic record based on the at least one parameter and the indication received from the text mining platform, wherein the future performance characteristic indicator is indicative of a likelihood of an actual value of the electronic record differing from a predicted value of the electronic record.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

As used herein, information may be "received" by or "transmitted" to, for example: (i) the text mining apparatus 800 from another device; or (ii) a software application or module within the text mining apparatus 800 from another software application, module, or any other source.

In some embodiments (such as shown in FIG. 8), the storage device 830 further stores text input data 816, a semantic rules database 860, and the text mining results database 880. Examples of databases that may be used in connection with the apparatus 800 will now be described in detail with respect to FIGS. 8B and 8C. Note that the database described herein is only one example, and additional and/or different information may be stored therein. Moreover, various databases might be split or combined in accordance with any of the embodiments described herein.

Referring to FIG. 8B, a table is shown that represents the semantic rules database 860 that may be stored at the apparatus 800 according to some embodiments. The table may include, for example, entries identifying rules and algorithms that may facilitate text mining. The table may also define fields 862, 864, 866 for each of the entries. The fields 862, 864, 866 may, according to some embodiments, specify: a semantic rule identifier 862, a rule description 864, and one or more semantic tags 866 for each rule. The semantic rules database 860 may be created and updated, for example, based on information received from an operator or administrator.

The semantic rule identifier 862 may be, for example, a unique alphanumeric code identifying logic that may be applied during text mining. The rule description 864 may describe the rule and the one or more semantic tags 866 may define when the rule is triggered. For example, the presence of the word "DOGS" in a claim file might trigger the semantic rule associated with identifier "SR_10002" to indicate that an "ANIMAL_BITE" might be associated with that claim file. According to some embodiments, the semantic rules database 860 may store multiple versions of a semantic rule (and different rule versions may be associated with different text mining results databases 500 versions).

Referring to FIG. 8C, a table is shown that represents the text mining results database 880 that may be stored at the apparatus 800 according to some embodiments. The table may include, for example, entries identifying results of a text mining operation. The table may also define fields 882, 884, 886, 888, 890 for each of the entries. The fields 882, 884, 886, 888, 890 may, according to some embodiments, specify: a text mining result identifier 882, a loss event 884, a date 886, a rule identifier 888, and a claim identifier 890. The text mining results database 880 may be created and updated, for example, based on an analysis of text input data received from multiple sources. Note that text mining operations and analysis might be performed on historical text input data in addition to, or instead of, current text input data.

The text mining result identifier 882 may be, for example, a unique alphanumeric code identifying a result of text analysis. The loss event 884 might categorize a cause associated with the event and the date 886 might indicate when the loss occurred. The rule identifier might indicate which rule resulted in the entry being created and may be based on, or associated with, the semantic rule identifier 862 stored in the semantic rule database 860. The claim identifier 890 might indicate a claim file associated with the event and/or an associated insurance policy. Note that other identifiers may be stored in the text mining results database 880 in addition to, or instead of, the claim identifier 890. Examples of such other identifiers include a party identifier, a policy identifier, an entity identifier, a tax identifier, a physician identifier, etc. Moreover, a volatility score might be stored in the text mining results database 880 (e.g., after it has been calculated by a predictive model).

Figure 9:
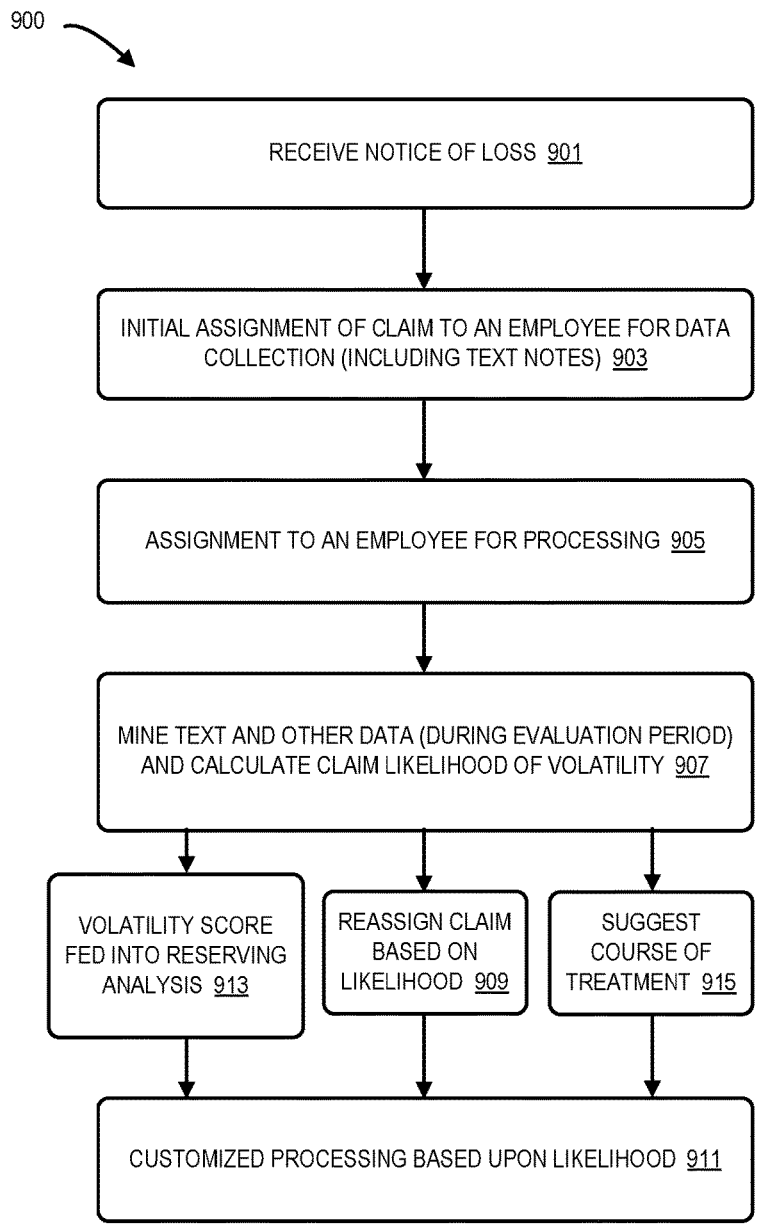
FIG. 9 is a flowchart of a method of claim administration based upon a claim's predicted likelihood of exhibiting volatility according to some embodiments.

FIG. 9 is flowchart 900 illustrating a method of claim administration based upon a claim's predicted likelihood of exhibiting cost volatility, according to one embodiment of the invention. The method begins at step 901, when an insurance company receives a notice of loss. The notice of loss may be received from a claimant, from a pre-processor, or from a 3rd party administrator, for example. The notice of loss may be received by telephone, mail, e-mail, web page, web server, or through other data communications over the Internet. In addition, a notice of loss may be received directly or indirectly from sensors monitoring an insured property via a wireless or wired network connection.

Next, at step 903, the claim is assigned to a first employee of the company, or agent associated therewith, for the collection of basic data relating to the claim. At step 905, the claim is assigned to a second employee for processing. This step may be manual. For example, the first employee may review the collected data and make a judgment as to which second employee has the most appropriate skill set and experience level for handling the claim. Alternatively, the assignment may be automatic. For example a computer may assign the claim to the second employee based upon a series of computations relating to pre-set criteria.

After a period of time in which additional claim characteristics are collected by the employee assigned to process the claim (e.g., 30, 45, 60, or 90 days after the notice of loss) the back-end application computer server 103 may access text mined data and other data at step 907 to calculate a claim likelihood of volatility. According to some embodiments, the process at step 907 might determine medical invoice totals associated with certain claims. The medical invoice totals might, for example, include information associated with pharmacy charges, doctor office visits, hospital charges (both inpatient and outpatient), emergency room costs, ambulatory surgical center fees, nursing facility costs, and/or ambulance trips. According to some embodiments, the data gathered at step 907 includes a count of visits of one or more of the following types (during an evaluation period): emergency, critical care, diagnostic, physical therapy, surgery, anesthesia, and/or radiology. According to some embodiments, the data gathered at step 907 includes indications associated with: a nervous injury, a back sprain, a fracture, a dislocation, an open wound, a musculoskeletal injury, a compensation coverage code (as determined by state), network penetration (in-network versus out-of-network expenses), an estimated total medical spend, an accident state, a claimant age, a nature of benefit, a business unit, a business group, an estimated indemnity payment, and/or whether or not a claimant had prior injuries and/or medical conditions.

The system may then calculate the information determined at 906 to calculate a predictive estimate of the likelihood that the claim will exhibit volatility at step 907. The back-end application computer server 103 outputs a value indicating the likelihood that the claim will be volatile. For example, the likelihood may take the form of a raw score, a probability value in the form of a probability, i.e., a numeric value between zero and one or between zero percent and one hundred percent, a tier or classification value (e.g., high likelihood, medium likelihood, or low likelihood or level 1, level 2, level 3, level 4, or level 5). The likelihood value may also be a relative value comparing the likelihood of the claim being volatile with the likelihood that other claims being processed will be volatile. This relative value may be an absolute ranking of the claim with respect to other pending claims, or it may be a value indicating a tranche of claims, for example, the top 5%, 10%, or 90% of claims, or top 5, top 10, or top 90 claims most likely to be volatile claims. The output likelihood value can then be used for customized processing of the claim. A data file or report may also be generated for each claim or for a group of claims, which may include data parameters associated with the characteristics of the claim or group of claims, as well as their likelihood of being volatile and the ranking with respect to other pending claims. This report may then be forwarded, for example, to the client terminal 107.

Next, at step 909, the workflow processor 111 reassigns the claim to an employee for managing based upon the likelihood value output by the back-end application computer server 103. Lastly, at step 911, the assigned employee processes the claim according to its likelihood of being volatile. For example, the level of oversight, level of medical care and review (as described above), non-compensatory expense tolerance, and level of factual investigation for the claim may be based in part on the volatility likelihood. Alternatively, the medical care and review (as described above), non-compensatory expense tolerance, and level of factual investigation for the claim may be set automatically by the workflow processor 111 based on the volatility likelihood.

In addition, or in the alternative to reassigning the claim at step 909, the back-end application computer server 103 or other computing device on the network 105, may utilize the likelihood value to inform estimates of loss reserves maintained by the insurance company and/or provide a volatility score to a reserving analysis (step 913), as described further below in relation to FIG. 10.

As another additional or alternative step to step 909, the back-end application computer server 103 outputs a suggested course of treatment for the injured party (step 915). The suggested course of treatment is based, in one implementation, on an expert system that identifies appropriate treatments based on volatility likelihood or changes in volatility likelihood, as well as the specific condition, presentation, and medical history of the injured party. Recommended treatments are based on the specific condition and medical history of the injured party as well as, at least in part, historical treatment statistics, expert advice, and/or on appropriate clinical trials. Such recommendations may be provided, for example, to claims adjusters and/or to case management personnel to review and consider based on the specific condition and injured party involved in the claim.

Figure 10:
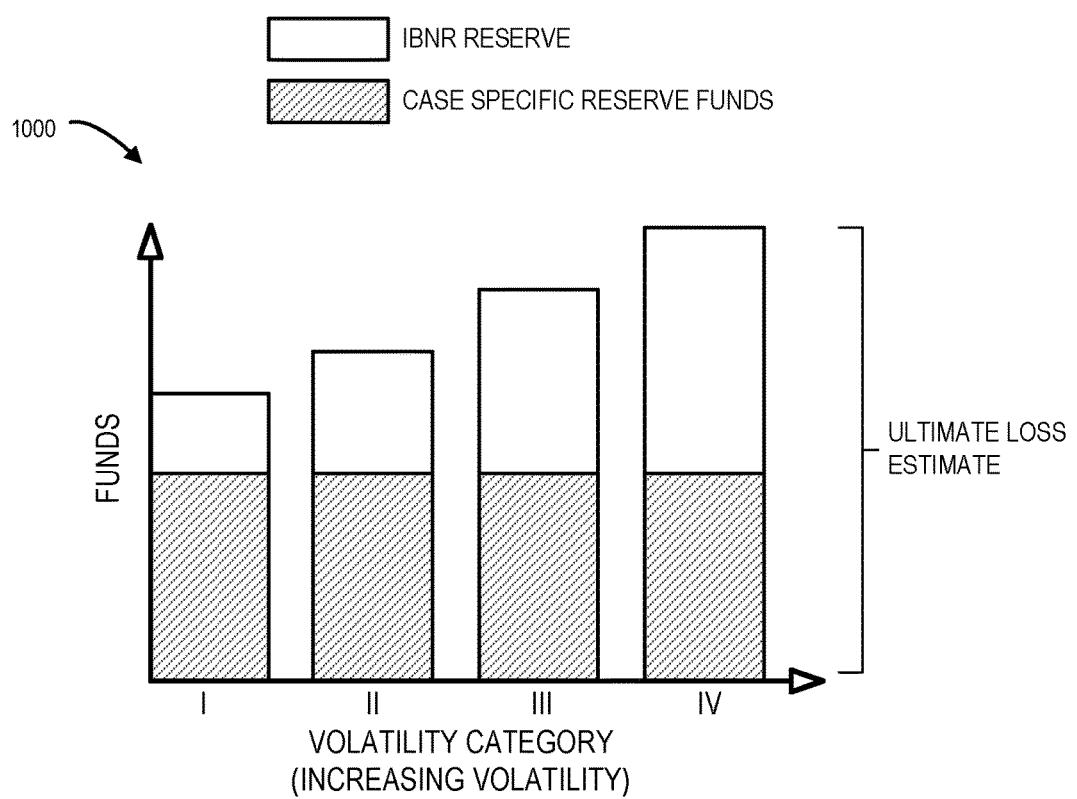
FIG. 10 illustrates an optional loss reserving strategy in accordance with some embodiments.

FIG. 10 illustrates an optional loss reserving strategy which an insurance enterprise may elect to implement based on volatility information yielded by a computerized predictive model, according to one embodiment of the invention. In the strategy depicted in FIG. 10, claims are divided into four groups, based on their relative likelihood of volatility in comparison to other claims being processed, to inform an estimate of ultimate claims costs in aggregate. For example, Group I includes the lowest two deciles of claims ranked based on their likelihood of volatility. Group II claims include claims in the next three deciles. Group III includes the claims ranked in the sixth through eight deciles. Group IV includes the 20% of claims having the highest likelihoods of volatility. The depicted division of claims is merely illustrative in nature. Claims may be broken down in to fewer or more groups. In addition, in alternative implementations, certain groups include a larger range of claims and others include fewer claims. For example, in one implementation, each group has incrementally fewer claims than the preceding group. Group I includes the lowest 50% of claims ranked by volatility likelihood, and Group IV includes the 5% of claims having the highest likelihood of volatility. In still other implementations, claims are grouped based on their absolute likelihood of volatility.

In another embodiment of the invention, multiple, or all of a company's insurance claims are subject to the predictive computation. In this embodiment, the predictive computation is executed consistently at a pre-set interval, for example, once a week, to claims that have reached a pre-set age (e.g., 30, 45, 60, or 90 days after notice of loss) during the time interval. These selected claims may then be managed according to their volatility likelihood. Alternatively, claims may be ranked according to their volatility likelihood, with those claims that are most likely (e.g., top 5%, 10% or 25% of claims, or top 5, 10 or 25 claims, etc.) to be volatile being managed in part according to their volatility likelihood. In this alternative, the number of pending claims may be adjusted in relation to the number of employees that are available for claim processing. Volatility likelihood for claims may be occasionally or periodically reprocessed to determine if information obtained since a previous volatility likelihood estimation alters the likelihood that that the claim will be volatile. Such a change and/or the magnitude of such a change relative to a prior volatility score is then analyzed to determine whether the claim merits different management, including but not limited to a different course of medical treatment.

Figure 11:
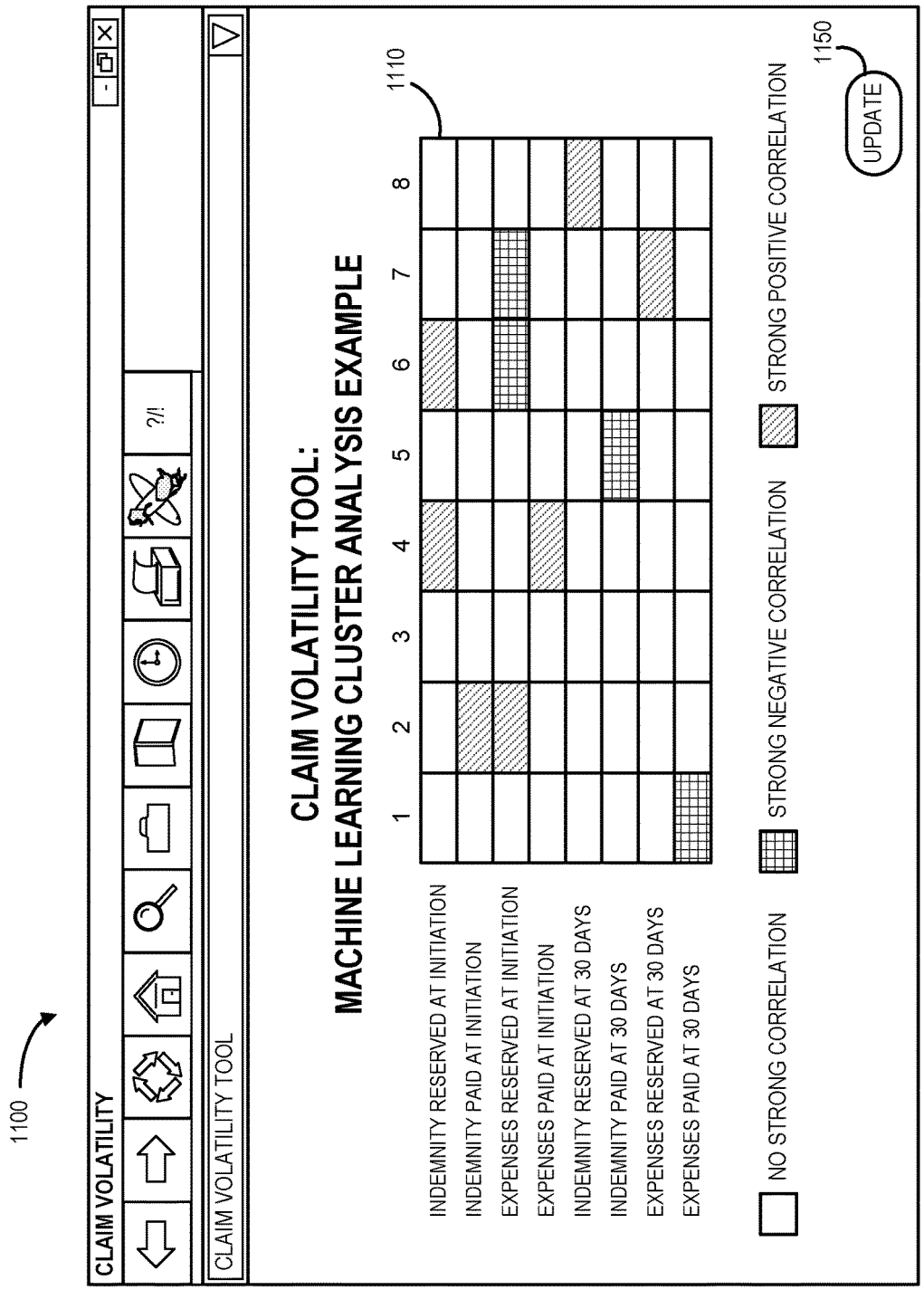
FIGS. 11 and 12 are claim volatility tool machine learning cluster analysis examples according to some embodiments.
Figure 12:
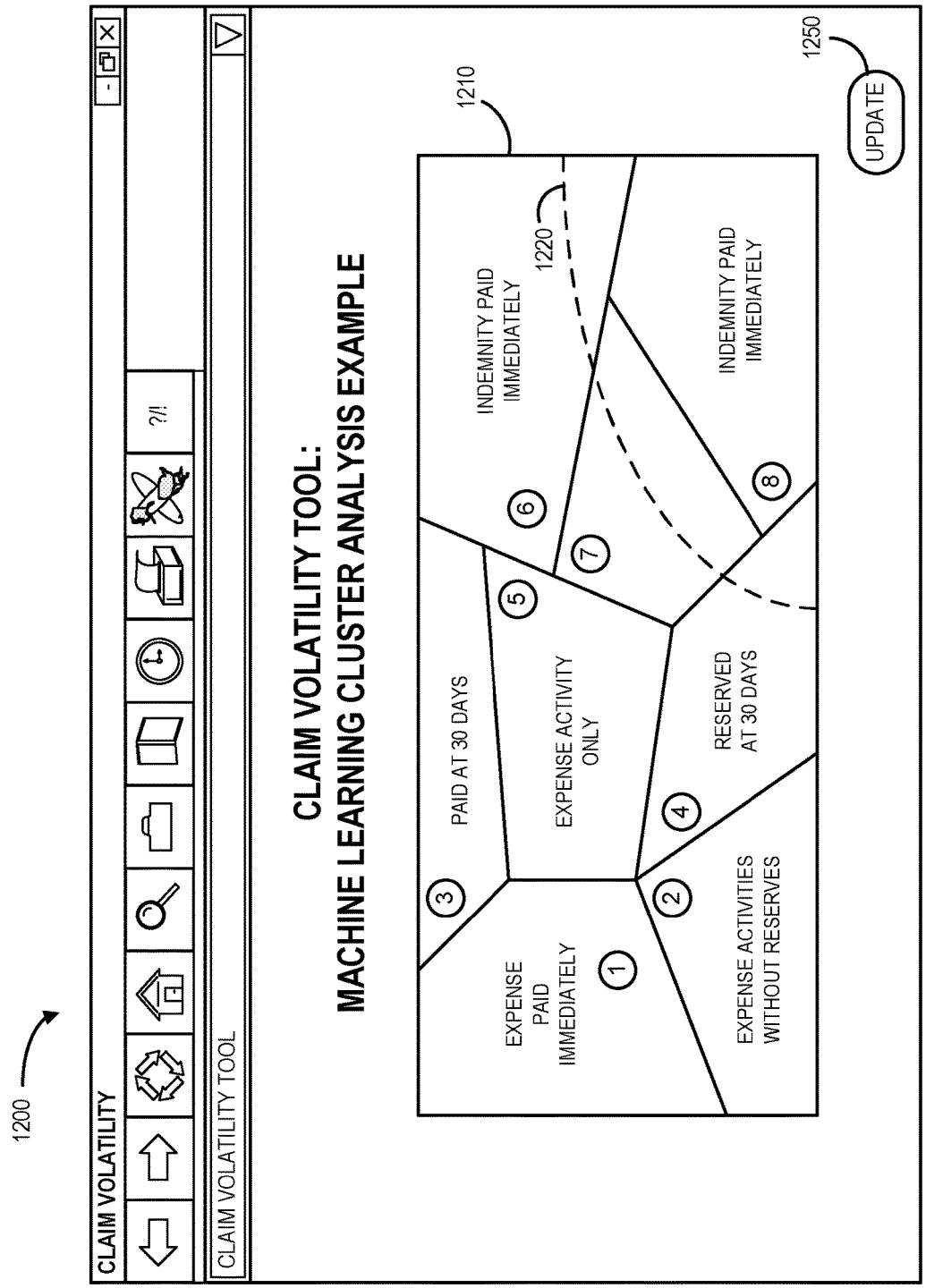

FIG. 11 is a claim volatility tool machine learning cluster analysis example display 1100 according to some embodiments (note that some embodiments described herein might not utilize a cluster analysis technique). Clustering may, for example, find patterns that are resident in a volume of data, without regard to specific theories (e.g., that might explain why the patterns exist). It is one technique to discover prevalent patterns. In the illustration of FIG. 11, eight clusters of claims 1110 are displayed for different indemnity reserved/paid values at various times (e.g., at initiation, at 30 days, etc.). For each, the display 1100 graphically indicates if there is no strong correlation, a strong negative correlation, or a strong positive correlation. According to some embodiments, a user might select a graphically displayed element to see more information about that element and/or select an update icon 1150 to refresh the display with new data. FIG. 12 is a claim volatility tool machine learning cluster analysis example display 1200 according to another embodiment. In the illustration of FIG. 12, eight clusters of claims 1210 are displayed for different indemnity reserved/paid values at various times (e.g., at initiation, at 30 days, etc.). For each, the display 1200 graphically indicates areas and boundaries, including linear boundaries and curved boundaries 1220, associated with correlations. According to some embodiments, a user might select a graphically displayed element to see more information about that element and/or select an update icon 1250 to refresh the display with new data.

Figure 13:
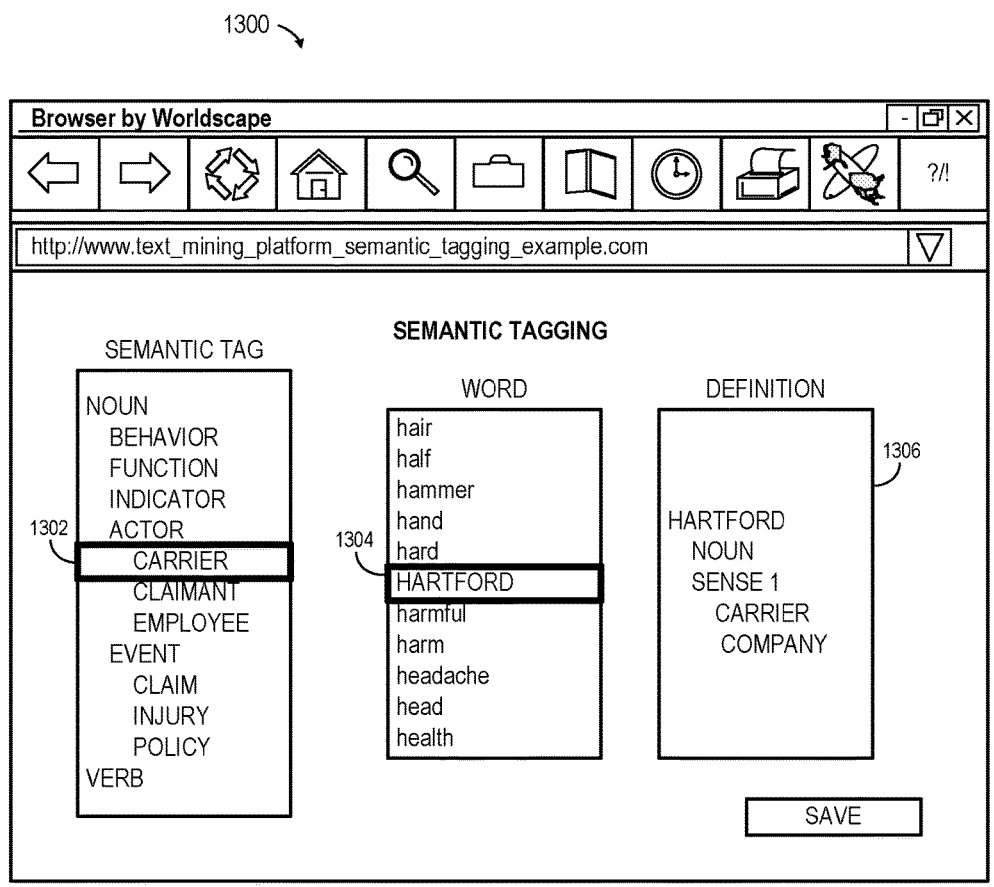
FIG. 13 is a text mining semantic tagging display in accordance with some embodiments.

User displays might also be provided to facilitate text mining in connection with any of the embodiments described here. For example, FIG. 13 illustrates a semantic tagging graphical user interface 1300 in accordance with some embodiments of the present invention. The semantic tagging interface 1300 may let the administrator select one or more words 1304 in a library as a "semantic tag" 1302 and/or provide a definition 1306 (e.g., a hierarchy of data elements may define the word "Hartford" as an insurance "carrier" and "company" as illustrated in FIG. 13).

Figure 14:
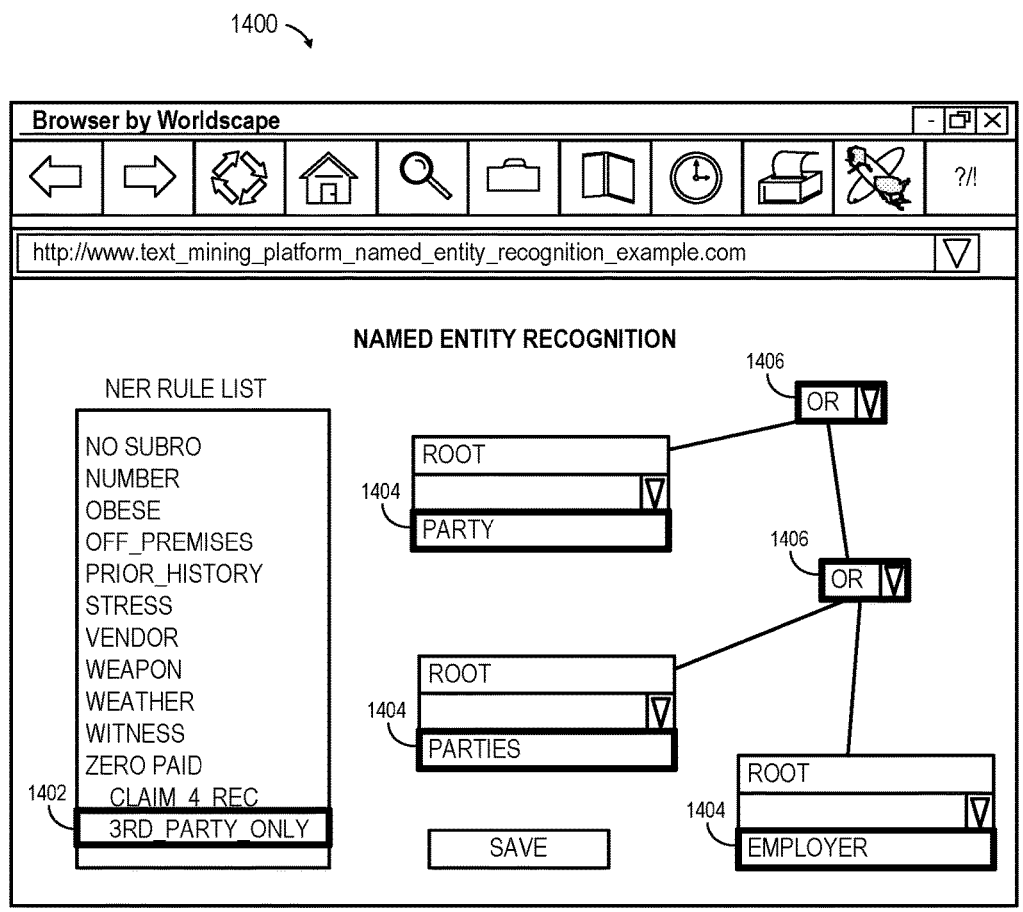
FIG. 14 is a text mining named entity recognition display according to some embodiments.

FIG. 14 illustrates a named entity recognition graphical user interface 1400 that may be provided via the administrator interface 170 in accordance with some embodiments of the present invention. In particular, the named entity recognition graphical user interface 1400 may let the administrator select a named entity recognition rule 1402 from a list of rules. Various root words 1404 may then be tied together via logical connectors 1406 to define the selected rule (e.g., the presence of "party" or "parties" or "employer" may trigger a "3RD_PARTY_ONLY" rule as illustrated in FIG. 14.

Figure 15:
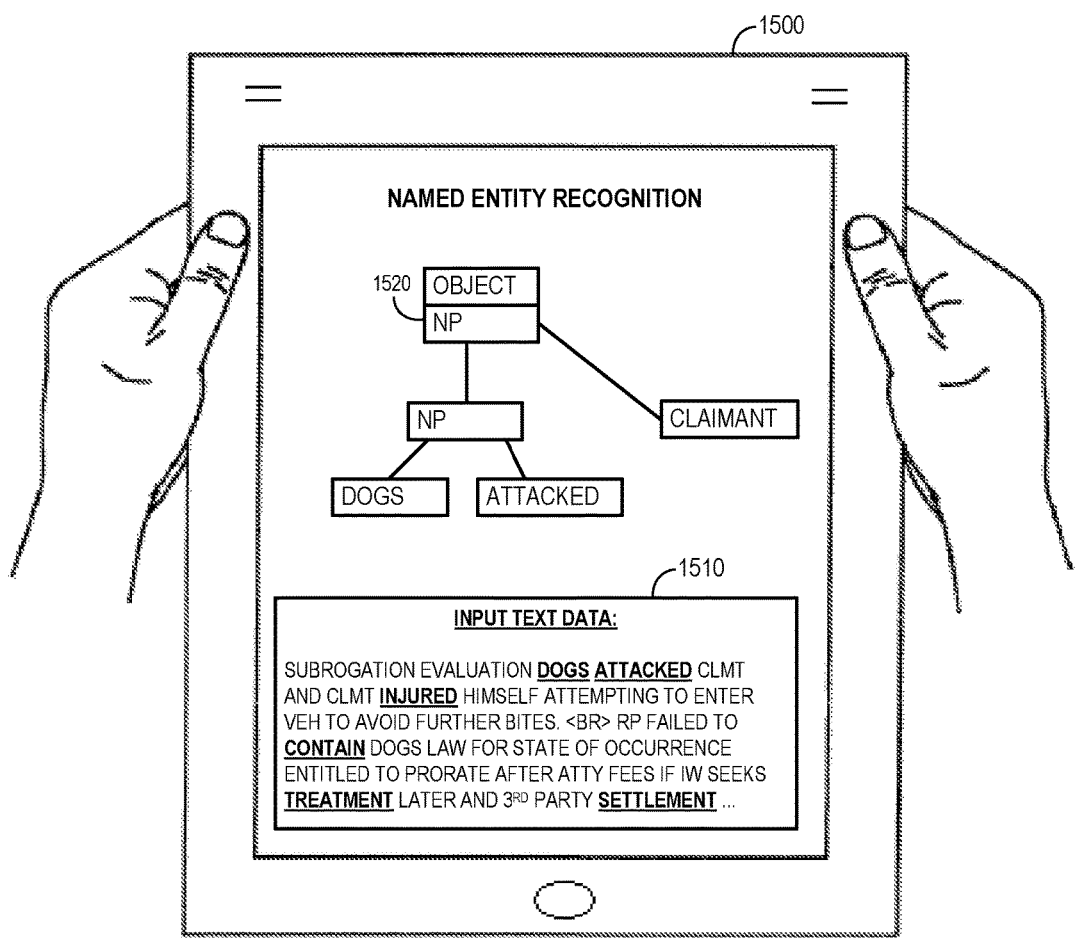
FIG. 15 illustrates a wireless or tabular device in accordance with some embodiments of the present invention.

FIG. 15 illustrates a wireless or tabular device 1500 displaying results 1510 of a named entity recognition process in accordance with some embodiments of the present invention. For example, in some embodiments, the device 1500 is an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly with a remote entity.

The device 1500 may be used to graphically tie together various Noun Phrases ("NP") 1520 in association with sentence subjects, clauses, objects, etc. For example, the results 1510 illustrated in FIG. 15 display the triggered words in bold and underlined text (e.g., "dogs," "attacked," "injured," etc.). In this way, the interfaces described herein may be used to map typographical errors in the text input data to a word dictionary, map phrases in the text input data to a phrase dictionary, apply semantic tags to the mapped phrases, match named entity recognition rules based on the applied semantic tags, and/or output rule matches at a level representing at a note level, a sentence level, and/or a phrase level. This enhanced information may then be used to facilitate predictions of volatility for insurance claims in accordance with any of the embodiments described herein. The text mining information might be associated with, by way of examples only, subrogation related data (e.g., lawsuit information, a self-inflicted indication, detection of a landlord, etc.); fraud related data (e.g., a lack of evidence, a dissatisfied party, a claimant who was paid in cash, etc.); and/or recover factors (e.g., diabetes, tobacco use, substance abuse, divorce, etc.).

Thus, embodiments may utilize text mining to help determine which characteristics of an insurance claim (e.g., a workers' compensation insurance) may indicate a large deviation from expectation. Moreover, text mining information such as injury details, presence of comorbidities, and/or the response of the medical community may further impact the volatility of a claim. The system may also help determine which characteristics are necessary and sufficient to distribute work efficiently based on volatility. Note that while most workers' compensation claims behave as anticipated, there is a population of volatile claims whose outcomes vary significantly from their expectations. It is these claims that can drive the total severity, and the predictive model described herein may deliver an ability to predict volatility (or lack of volatility) and facilitate early intervention via claim prioritization, escalation, and/or re-assignment. Moreover, volatility scores may be paired with business rules allows us to help ensure that quality referrals are reaching handlers. The model may also allow an enterprise to create claim profiles. For example, the enterprise might tranche open claims into high, medium, and low volatility. This lets a reserving process better allocate IBNR, as well as guide underwriting and pricing decisions. According to some embodiments, claims may be evaluated on a daily basis, so the enterprise may continually understand the volatility of the claim inventory and respond quickly when necessary. Some embodiments may be accessible through dynamic web-enabled reports and dashboards, which lets claim handlers better monitor performance and respond quickly to claims which might be in need of immediate attention.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

Applicants have discovered that embodiments described herein may be particularly useful in connection with insurance policies and associated claims. Note, however, that other types of business and insurance data may also benefit from the invention. For example, embodiments of the present invention may be used in connection with automobile insurance policies, etc.

Moreover, although some embodiments have been described with respect to particular text mining approaches, note that any of the embodiments might instead be associated with other text processing techniques. For example, natural language processing may operate to mine certain characteristic information from various social networks to determine whether a party is engaging in certain risky behavior or providing high risk products. It is also contemplated that embodiments may process recommendations in one or more languages, such English, French, Arabic, Spanish, Chinese, German, Japanese and the like. In an exemplary embodiment, a system can be employed for sophisticated text analyses, wherein text can be recognized irrespective of the text language. The relationships between the various words/phrases can be clarified by using a rules engine for classifying words/phrases as a predictor of certain underwriting risk.

According to some embodiments, text data may be used in conjunction with one or more predictive models to take into account a large number of underwriting and/or other parameters. The predictive model(s), in various implementation, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior text data and outcomes known to the insurance company. The specific text data and outcomes analyzed may vary depending on the desired functionality of the particular predictive model. The particular text data parameters selected for analysis in the training process may be determined by using regression analysis and/or other statistical techniques known in the art for identifying relevant variables and associated weighting factors in multivariable systems. The parameters can be selected from any of the structured data parameters stored in the present system, whether the parameters were input into the system originally in a structured format or whether they were extracted from previously unstructured text, such as from big data.

In the present invention, the selection of weighting factors (either on a keyword level or a text source level) may improve the predictive power of the text mining. For example, more reliable text sources may be associated with a higher weighting factor, while newer or less reliable sources might be associated with a relatively lower weighting factor.

Figure 16:
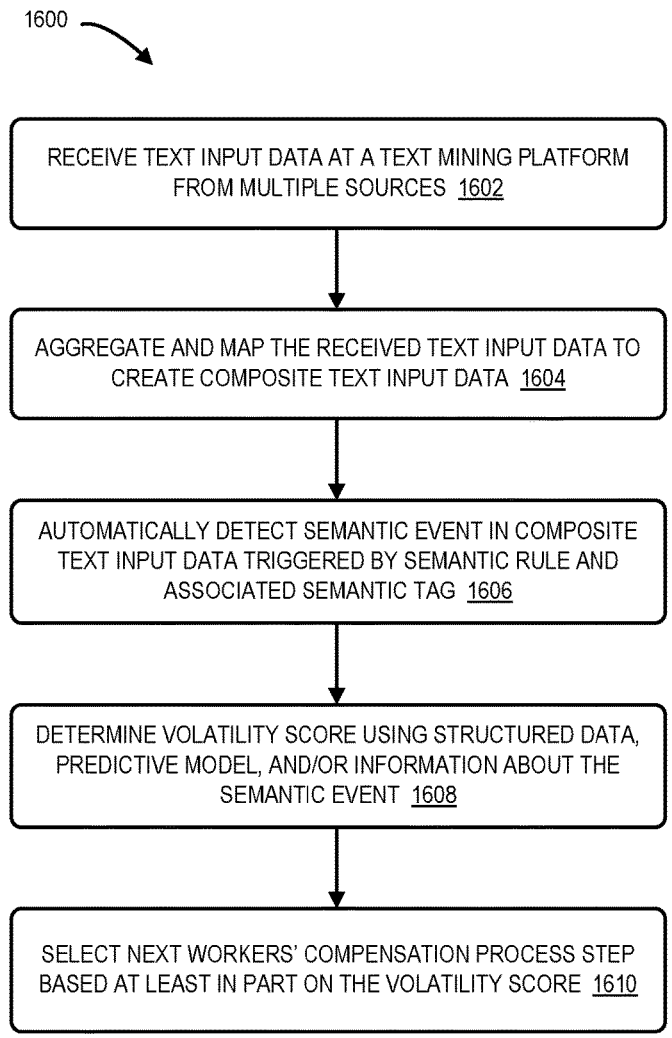
FIG. 16 is a high level flow chart of an insurance policy renewal process in accordance with some embodiments.

Although some embodiments have been described with respect to the use of volatility information to assign funds to various accounts, note that volatility information may be used in connection with other types of decisions. For example, FIG. 16 illustrates a workers' compensation insurance policy renewal method 1600 in accordance with some embodiments. At 1602, text input data may be received at a text mining platform from multiple sources. At 1604, the text mining platform may aggregate and map the received text input data to create composite text input data. At 1606, the text mining platform may automatically detect a semantic event in the composite text input data triggered by a semantic rule and associated semantic tag. At 1608, a back-end application computer server may determine a volatility score using structured data, a predictive model, and/or and information about the sematic event. The system may then select a next workers' compensation process step based at least in part on the volatility score at 1610. The next process step might be associated with, for example, a renewal decision. According to some embodiments, the renewal decisions might be associated with a loss rating load for volatile and non-volatile claims and/or variable development factors (e.g., associated with geographic location or industry). For example, a risk score might undergo a multivariate enhancement. Note that for larger risks, an account's actual loss history might be more credible. Also note that volatility scores might be provided to a pricing tool and trending and development may be based on the volatility scores provided for accounts. According to some embodiments, the process step selected at 1610 might be associated with an automatic renewal decision or the flagging of a decision to be reviewed by a special handler.

Figure 17:
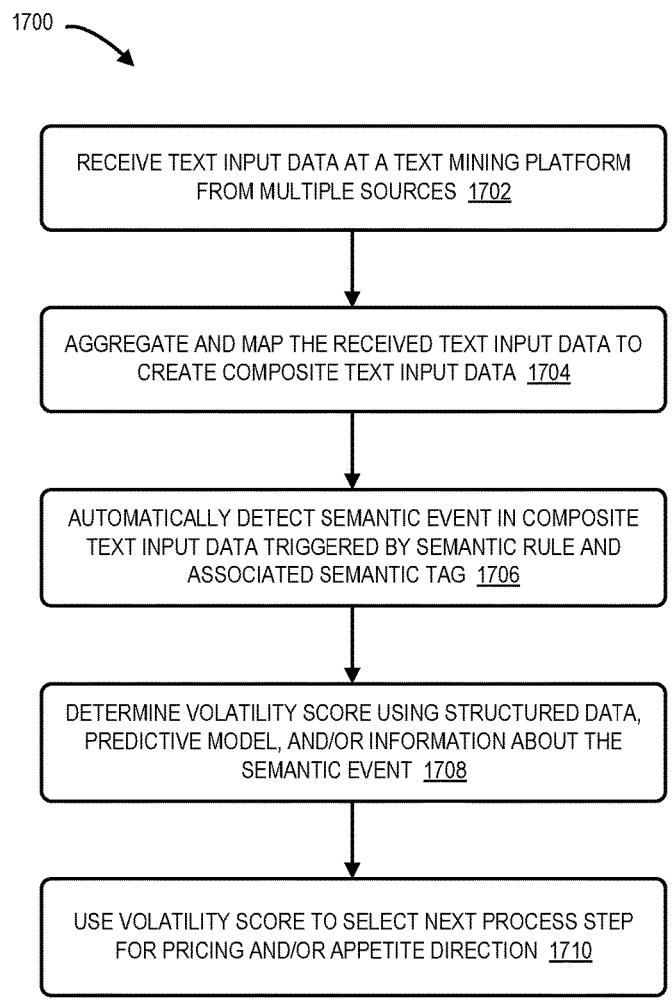
FIG. 17 is a high level flow chart of an insurance pricing and appetite process in accordance with some embodiments.

FIG. 17 illustrates an insurance pricing and appetite direction method 1700 in accordance with some embodiments. At 1702, text input data may be received at a text mining platform from multiple sources. At 1704, the text mining platform may aggregate and map the received text input data to create composite text input data. At 1706, the text mining platform may automatically detect a semantic event in the composite text input data triggered by a semantic rule and associated semantic tag. At 1708, a back-end application computer server may determine a volatility score using structured data, a predictive model, and/or information about the sematic event. The system may then select a next process step (e.g., associated with insurance pricing and/or appetite decisions) based at least in part on the volatility score at 1710. For example, volatility scores might be incorporated directly into pricing and appetite direction to target accounts with low likely volatility (which may improve Return On Equity ("ROE")). Note that volatile claims are not uniform (e.g., there might be geographic distribution with and between states). Also note that clustering can identify root causes, such as regional causes (e.g., medical malpractice patterns, wages and benefit levels, employee demographic drivers, etc.). Other uses for volatility data might include outlier detection and warning (e.g., an automatic message might be triggered for the top and bottom 5% of cases) and/or the addition of filters (e.g., for rate, region (group of counties), agency, individual underwriter, account, claim capping, differences in volatility in different segments of a book of insurance, state, market segment, combinations of filters, a process to find profitable segments, and/or a process to find unprofitable segments) to help provide degree of confidence indication for early loss ratio values, ROE values, etc.

Some embodiments have been described herein with respect to workers' compensation insurance claims. Note, however, that any embodiments might also be applicable to, for example, volatility in Automobile Liability ("AL") and/or General Liability ("GL") insurance scenarios. For example, a lack of structured data may present challenges (such as when medical bills are not paid directly by an insurance enterprise or demand packages take years from an original Date Of Loss ("DOL")). Moreover, embodiments might take advantage of the fact that claims staff can have significant knowledge about exposure, including pure exposure (e.g., associated with general and special damages), offsets (e.g., associated with negligence and/or causation), and varied expert opinions.

Figure 18:
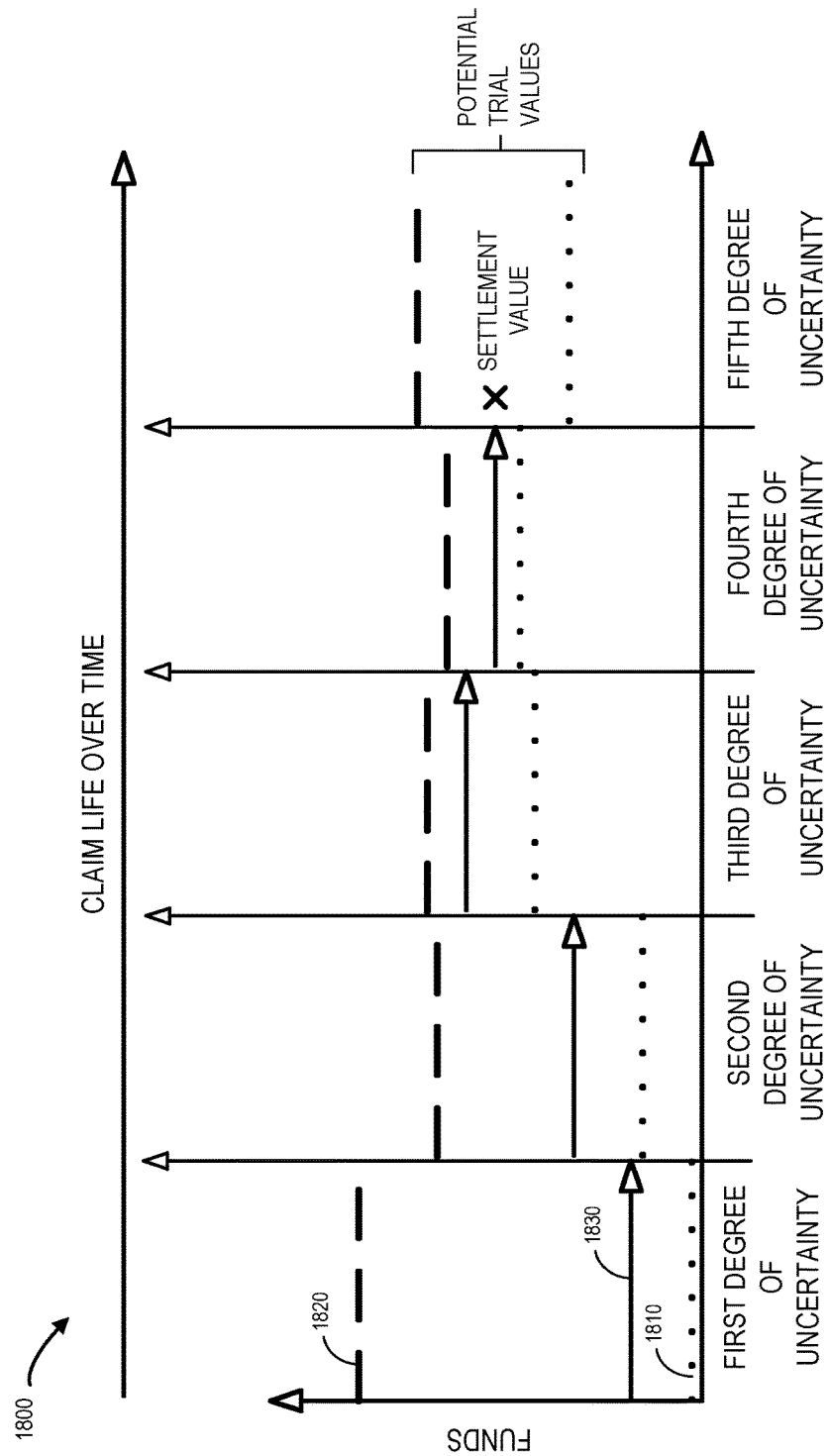
FIG. 18 illustrates a general liability reserving calculation over time according to some embodiments.

These types of information may be used to improve reserving calculations. For example, FIG. 18 illustrates a ("GL") reserving calculation 1800 over time according to some embodiments. Note that the calculation 1800 may refine a minimum amount of potential liability 1810 (e.g., a reasonable upper limit of exposure for the insurance enterprise as illustrated with dotted lines in FIG. 18) and a maximum amount of potential liability 1820 (e.g., a reasonable lower limit of exposure for the insurance enterprise as illustrated with dashed lines in FIG. 18) over time during the life of an insurance claim (e.g., beginning with a FNOL and ending with a settlement or a trial result). Moreover, an appropriate reserve amount 1830 may be determined above the minimum potential liability 1810 and the maximum potential liability 1820. Note that these values may be adjusted over time. For example, the insurance claim might initially be associated with a first degree of uncertainty, such as when a notice of loss is initially received (e.g., based on the initial facts of the case, an injury overview, and/or an attorney notice). The insurance claim might then be associated with a second degree of uncertainty, such as during an investigation (e.g., based on negligence information, further injury details, etc.). Note that periods of sporadic contact or relative silence might result in no changes to the minimum potential liability 1810, maximum potential liability values 1820, and/or the appropriate reserve amount 1830. A demand package might result in a third degree of uncertainty based on, for example, medical documentation, expert opinions, and pure exposure information. The insurance claim might then be associated with a fourth degree of uncertainty, such as during discovery and/or negotiation processes (e.g., based on additional medical documents, further expert opinions, settlement talks, etc.). Finally, a settlement value might be determined (associated with a fifth degree of uncertainty and illustrated with an "X" in FIG. 18) representing an amount within a range of potential trial outcomes. Note that a liability claim may have two elements associated with uncertainty: (1) an ultimate amount of damages, and (2) an insurer's liability for some or all of those damages. The degrees of uncertainty described herein might be associated with either of those elements (e.g., and one or more of those elements might be adjusted based on additional facts, expert opinions, etc.).

Such an approach may help adjusters capture a rage of potential reserves along with degrees of certainty (e.g., high, medium, and low degrees of certainty). Moreover, minimal additional effort might be required as some or all of the analysis may already be performed. Note that quality metrics might be available for adjusters who disproportionately change reserves with a high degree of certainty or do not meet benchmark degrees of certainty. Moreover, some embodiments may compliment manual processes with flags reporting, for example, an unfavorable venue, a specific party involved in a claim, claim durations, text mining events, etc. during an initial manual process and/or improve development of variables for volatility scoring model.

Some potential applications of a GL reserving calculation over time might include, for example, an improved documentation of existing thought processes associated with claims, a reduction in stair-step reserve changes, and/or improved input to scoring models. Other advantages might include more accurate IBNR estimates in connection with actuarial indications. Some embodiments might further include improved early identification of risk characteristic associated with insurance lines of business book management and underwriting, an improved degree of certainty for loss ratio and return on equity calculations, better understanding of emerging risks, and/or improved industry and geographic expansion in view of book management and underwriting considerations.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system for predicting a future performance characteristic associated with an electronic record, comprising:
a text mining platform, including:
a text mining communication device to receive text input data associated with the electronic record from multiple sources;
a text mining processor coupled to the text mining communication device; and
a text mining storage device in communication with said text mining processor and storing instructions adapted to be executed by said text mining processor to:
(i) aggregate and map the received text input data to create composite text input data,
(ii) automatically detect a semantic event in the composite text input data triggered by a semantic rule and associated semantic tag,
(iii) flag the detected semantic event as meeting a pre-determined condition,
(iv) update a text mining result database, responsive to the flag, by adding an entry to the database identifying the detected semantic event and the triggering semantic rule, and
(v) transmit an indication for the electronic record based on the associated data in the text mining result database; and
a back-end application computer server coupled to the text mining platform, including:
a back-end communication device to receive the indication for the electronic record transmitted by the text mining platform;
a back-end processor coupled to the back end communication device; and
a back-end storage device in communication with said back-end processor and storing instructions adapted to be executed by said back-end processor to:
(i) determine at least one parameter corresponding to a characteristic of the electronic record,
(ii) execute a computerized predictive model to predict a future performance characteristic indicator for the electronic record based on the at least one parameter and the indictor received from the text mining platform, wherein the future performance characteristic indicator is indicative of a likelihood of an actual value of the electronic record differing from a predicted value of the electronic record, wherein the computerized predictive model is generated based at least in part on an analysis of medical spending costs for a plurality of insurance claims and the volatility indictor is used to provide a degree of certainty in connection with at least one of: (i) a loss ratio prediction, and (ii) a return on equity prediction, and
(iii) output an indication of the predicted future performance characteristic indictor for the electronic record,
wherein the predicted future performance characteristic is a volatility indictor, the electronic record is associated with an insurance claim, and the volatility indicator is indicative of a likelihood of an actual total resolution cost of the insurance claim differing from a predicted total resolution cost of the insurance claim.

2. The system of claim 1, wherein the semantic event is associated with at least one of: (i) a word, (ii) a phrase, (iii) a shorthand term, (iv) a course of action, and (v) an enterprise name.

3. The system of claim 1, wherein the triggering semantic rule was defined by an administrator using a graphical user interface and is associated with at least one of: (i) a noun, (ii) a verb, (iii) a definition, (iv) a semantic tree, (v) a named entity recognition rule, (vi) a root, (vii) a noun phrase, (viii) a prepositional phrase, and (ix) a verb phrase.

4. The system of claim 1, wherein the volatility indicator is to adjust a collective loss reserve for a group of insurance claims.

5. The system of claim 1, wherein the computerized predictive model is configured to update itself after at least one new insurance claim cost has been determined and the back-end application computer server is to recommend a course of treatment for a claimant of the insurance claim based on the volatility indicator.

6. The system of claim 1, wherein a set of volatility indicators are filtered in accordance with at least one of: (i) geographic region, (ii) an insurance agency, (iii) underwriting decisions, (iv) an account, (v) claim capping, (vi) industry, (vii) differences in volatility in different segments of a book of insurance, (viii) a state, (ix) a market segment, (x) combinations of filters, (xi) a process to find profitable segments, and (xii) a process to find unprofitable segments.

7. The system of claim 1, wherein the volatility indictor automatically triggers an outlier warning electronic message and the volatility indicator is used by at least one of: (i) an insurance policy renewal process, and (ii) an insurance policy appetite application.

8. The system of claim 1, wherein the text input data is associated with at least one of: (i) an insurance claim file, (ii) an insurance claim note, (iii) a medical report, (iv) a police report, (v) social network data, (vi) big data information, (vii) a loss description, (viii) an injury description, (ix) a first notice of loss statement, (x) telephone call transcript, (xi) optical character recognition data, (xii) third-party data, and (xiii) a governmental agency.

9. The system of claim 1, wherein the predicted future performance characteristic indicator is to be utilized by at least one of: (i) a workers' compensation claim, (ii) a personal insurance policy, (iii) a business insurance policy, (iv) an automobile insurance policy, (v) a home insurance policy, (vi) a sentiment analysis, (vii) insurance event detection, (viii) a cluster analysis, (ix) a predictive model, (x) a subrogation analysis, (xi) fraud detection, (xii) a recovery factor analysis, (xiii) large loss and volatile claim detection, (xiv) a premium evasion analysis, (xv) an insurance policy comparison, (xvi) an underwriting decision, and (xvii) indicator incidence rate trending.

10. The system of claim 1, wherein said flagging by the text mining processor is performed, and information about claims having predicted future performance characteristic indictor meeting a pre-determined threshold is pushed to an insurance platform, on at least a daily basis.

11. The system of claim 10, wherein the text input data is associated with a claims database text and at least one of: (i) third party data, and (ii) medical invoice information.

12. The system of claim 1, wherein the future performance characteristic indictor is used to categorize claims into high, medium, and low tranches.

13. The system of claim 12, wherein the tranches are determined based on least one of: (i) loss time costs, (ii) medical only costs, and (iii) total costs.

14. The system of claim 1, wherein the future performance characteristic indictor is used to identify a substantially fast moving claim based at least in part on a prior predicted indictor for that claim.

15. A computer-implemented method for predicting a future performance characteristic associated with an electronic record, comprising:
   aggregating and mapping, by a text mining platform processor, received text input data to create composite text input data for the electronic record;
   automatically detecting, by the text mining platform processor, a semantic event in the composite text input data triggered by a semantic rule and associated semantic tag;
   flagging, by the text mining platform processor, the detected semantic event as meeting a pre-determined condition;
   updating, by the text mining platform processor, a text mining result database, responsive to the flag, by adding an entry to the database identifying the detected semantic event and the triggering semantic rule;
   transmitting, by the text mining platform processor, an indication for the electronic record based on the associated data in the text mining result database;
   determining, by a back-end application computer processor, at least one parameter corresponding to a characteristic of the electronic record;
   executing, by the back-end application computer processor, a computerized predictive model to predict a future performance characteristic indicator for the electronic record based on the at least one parameter and the indictor received from the text mining platform, wherein the future performance characteristic indicator is indicative of a likelihood of an actual value of the electronic record differing from a predicted value of the electronic record, wherein the computerized predictive model is generated based at least in part on an analysis of medical spending costs for a plurality of insurance claims and the volatility indictor is used to provide a degree of certainty in connection with at least one of: (i) a loss ratio prediction, and (ii) a return on equity prediction; and
   outputting, by the back-end application computer processor, an indication of the predicted future performance characteristic indictor for the electronic record,
   wherein the predicted future performance characteristic is a volatility indictor, the electronic record is associated with an insurance claim, and the volatility indicator is indicative of a likelihood of an actual total resolution cost of the insurance claim differing from a predicted total resolution cost of the insurance claim.

16. A non-transitory computer-readable medium storing instructions adapted to be executed by a computer processor to perform a method to predict a future performance characteristic for an electronic record, said method comprising:
   aggregating and mapping received text input data to create composite text input data for the electronic record;
   automatically detecting a semantic event in the composite text input data triggered by a semantic rule and associated semantic tag;
   flagging the detected semantic event as meeting a pre-determined condition;
   updating a text mining result database, responsive to the flag, by adding an entry to the database identifying the detected semantic event and the triggering semantic rule;
   transmitting an indication for the electronic record based on the associated data in the text mining result database;
   determining at least one parameter corresponding to a characteristic of the electronic record;
   executing a computerized predictive model to predict a future performance characteristic indicator for the electronic record based on the at least one parameter and the indictor received from the text mining platform, wherein the future performance characteristic indicator is indicative of a likelihood of an actual value of the electronic record differing from a predicted value of the electronic record, wherein the computerized predictive model is generated based at least in part on an analysis of medical spending costs for a plurality of insurance claims and the volatility indictor is used to provide a degree of certainty in connection with at least one of: (i) a loss ratio prediction, and (ii) a return on equity prediction; and
   outputting an indication of the predicted future performance characteristic indictor for the electronic record,
   wherein the predicted future performance characteristic is a volatility indictor, the electronic record is associated with an insurance claim, and the volatility indicator is indicative of a likelihood of an actual total resolution cost of the insurance claim differing from a predicted total resolution cost of the insurance claim.

* * * * *